US012087474B2

(12) United States Patent
Yoshino et al.

(10) Patent No.: US 12,087,474 B2
(45) Date of Patent: Sep. 10, 2024

(54) CABLE AND ANTENNA DEVICE WITH COAXIAL CABLE

(71) Applicant: SONY SEMICONDUCTOR SOLUTIONS CORPORATION, Kanagawa (JP)

(72) Inventors: Yoshitaka Yoshino, Kanagawa (JP); Makoto Makishima, Kanagawa (JP); Taihei Satou, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 139 days.

(21) Appl. No.: 17/763,035

(22) PCT Filed: Sep. 15, 2020

(86) PCT No.: PCT/JP2020/034917
§ 371 (c)(1),
(2) Date: Mar. 23, 2022

(87) PCT Pub. No.: WO2021/060075
PCT Pub. Date: Apr. 1, 2021

(65) Prior Publication Data

US 2022/0344075 A1 Oct. 27, 2022

(30) Foreign Application Priority Data

Sep. 25, 2019 (JP) ................................ 2019-173887

(51) Int. Cl.
*H01B 7/26* (2006.01)
*H01B 7/18* (2006.01)
*H01B 11/18* (2006.01)

(52) U.S. Cl.
CPC ............. *H01B 7/26* (2013.01); *H01B 7/1875* (2013.01); *H01B 11/1808* (2013.01); *H01B 11/1895* (2013.01)

(58) Field of Classification Search
CPC .......... H01B 7/17; H01B 7/18; H01B 7/1875; H01B 7/1885; H01B 7/26; H01B 11/1808; H01B 11/1895; H01P 3/06; H01Q 17/00
See application file for complete search history.

(56) References Cited

U.S. PATENT DOCUMENTS

2006/0090923 A1 5/2006 Fetterolf, Sr.
2020/0161731 A1* 5/2020 Himi ........................ H01P 5/08

FOREIGN PATENT DOCUMENTS

CN 101840748 A 9/2010
CN 101853984 A 10/2010
(Continued)

OTHER PUBLICATIONS

International Search Report from corresponding PCT application PCT/JP2020/034917, dated Dec. 1, 2020.

*Primary Examiner* — Levi Gannon
(74) *Attorney, Agent, or Firm* — K&L Gates LLP

(57) ABSTRACT

A cable includes a first shield portion that includes at least one or more lines for transmitting a signal or electric power and that is provided on the outer side of the lines, a first layer that is provided in such a manner as to cover an outer circumference of the first shield portion and that includes a member that absorbs radio waves, a second shield portion that is provided on an outer side of the first layer, a second layer that is provided in such a manner as to cover an outer circumference of the second shield portion and that includes a member that absorbs radio waves, and insulating resin that covers an outer side of the second layer.

12 Claims, 21 Drawing Sheets

A

B

(56) References Cited

FOREIGN PATENT DOCUMENTS

| | | | |
|---|---|---|---|
| CN | 206993069 | U | 2/2018 |
| JP | 8222931 | A | 8/1996 |
| JP | 2004214137 | A | 7/2004 |
| JP | 2005142551 | A | 6/2005 |
| JP | 2005235409 | A | 9/2005 |
| JP | 4032898 | B2 | 1/2008 |
| TW | 200739615 | A | 10/2007 |
| WO | WO-2014010481 | A1 | 1/2014 |
| WO | WO-2019021716 | A1 | 1/2019 |

* cited by examiner

COMPONENTS OF ELECTROMAGNETIC FIELD

A

B

A

B

USB 2.0 CABLE

USB 3.0 CABLE

CABLE AND ANTENNA DEVICE WITH COAXIAL CABLE

TECHNICAL FIELD

The present technology relates to a power supply cable, a coaxial cable used for transmission of a television RF signal, a cable applicable to a differential serial transmission standard such as a USB (Universal Serial Bus) or an HDMI (registered trademark) (High-definition multimedia interface), and an antenna device with a coaxial cable.

BACKGROUND ART

A conventional coaxial cable connected to and used together with a balanced type antenna causes various problems because a shield wire of an outer side conductor thereof is connected to the ground of equipment that is to be connected to the coaxial cable, such as a television receiver. One of the problems is that a high-frequency current caused by characteristic impedance mismatch with the coaxial cable connected to an antenna flows to the outer cover of the coaxial cable and has an influence on the radiation characteristic of the antenna. Another problem is that, in a case where the coaxial cable is not connected correctly to the ground of equipment that is to be connected to the coaxial cable, as in a pig tail, noise of the equipment flows to the outer cover of the coaxial cable, and depending upon the length of the coaxial cable, the outer cover of the coaxial cable acts as an antenna and radiates radio waves. Also there is a problem that, depending upon the equipment to be connected to the coaxial cable, due to an influence of noise emitted from the equipment, noise of a common mode or a normal mode enters the outer cover or the core wire of the coaxial cable.

Conventionally, in order to solve the former problem described above, a spertopf that provides a high impedance in a desired frequency is provided in an antenna or a balun is used. Meanwhile, in order to solve the latter problem, the connection around a connector is established correctly over an overall circumference to prevent such a situation as described above. In a case where the problem remains even with this countermeasure, a ferrite core is wound around a connector side root portion of the coaxial cable to prevent current from flowing to the shield wire outer cover of the coaxial cable. On the other hand, in a case where the coaxial cable is placed into such portable equipment as a smartphone, the outer cover of the coaxial cable is peeled off and the coaxial cable is connected to the ground of an equipment to prevent current from flowing to the shield wire outer cover of the coaxial cable.

The present technology resides in solving such a problem that a performance cannot be demonstrated due to an influence of a high frequency current flowing to a cable and noise to be radiated from equipment that are caused by connecting the cable to the equipment. In short, a high frequency current is prevented from flowing to the outer cover of the cable, so that the influence of noise from equipment can be suppressed.

For noise suppression of a cable used, for example, in the USB standard (USB cable), such a technology as disclosed in PTL 1 is known. The USB cable includes four electric wires including one set of differential data lines, a power supply line, and a ground line. Generally, in order to suppress noise that is to be emitted from a cable to the outside and electromagnetic waves that are to enter the cable from the outside, a shield layer braided with a copper wire is provided. The shield layer is connected at the opposite end portions thereof to a ground potential portion.

However, the USB cable has a problem in that, in a case where the ground potential is not reliable, the effect of the electromagnetic shield becomes insufficient. The USB cable has another problem that, in a case where the ground potentials of two pieces of equipment connected to each other are not equal to each other, current flows through the shield layer and noise is transmitted to the pieces of equipment. Further, as a measure against this problem, it has been proposed to use, for a covering material for covering the shield layer, resin mixed with a radio wave absorption material such as ferrite to suppress noise. Furthermore, a countermeasure is taken by providing a noise suppression member such as an inductance at a connection portion of a cable at which the cable is connected to equipment.

For example, PTL 1 discloses a cable configured such that two signal wires, a shield that covers the surroundings of the two signal wires, and two power supply wires are covered with a sheath layer. The sheath layer includes a magnetic powder mixed resin layer and a protective sheath layer that covers the outer circumference of the magnetic powder mixed resin layer. Noise from the power supply wires can reliably be suppressed from intruding the signal wires. On the other hand, even if noise from the signal wires leaks from the shield, the magnetic powder mixed resin layer can reliably suppress the noise from intruding into the power supply wires 2.

CITATION LIST

Patent Literature

[PTL 1]
Japanese Patent No. 4032898

SUMMARY

Technical Problem

The configuration of PTL 1 described above targets a cable configured such that a power supply wire and a signal wire are arranged in a common sheath layer and is insufficient in regard to a measure against emission of noise from the cable to the outside and intrusion of noise from the outside into the cable.

Accordingly, the object of the present technology is to provide a cable and an antenna device with a coaxial cable that can suppress an influence of noise that may be caused by equipment and can suppress radiation noise from the cable.

Solution to Problem

The present technology provides a cable including a first shield portion that includes at least one or more lines for transmitting a signal or electric power and that is provided on an outer side of the lines, a first layer that is provided in such a manner as to cover an outer circumference of the first shield portion and that includes resin that absorbs radio waves, a second shield portion that is provided on an outer side of the first layer, a second layer that is provided in such a manner as to cover an outer circumference of the second shield portion and that includes resin that absorbs radio waves, and resin of a nature that covers an outer side of the second layer.

The present technology further provides an antenna device with a coaxial cable, in which the cable described above is connected to a balanced type antenna.

Advantageous Effect of Invention

According to at least one embodiment, the first shield portion, the first layer, the second shield portion, and the second layer are provided in order, and thus, noise by a large electromagnetic field of a near field can be suppressed. The advantageous effect described here is not necessarily restrictive, and any of the advantageous effects described in the present technology or an advantageous effect different from them may be applicable.

DESCRIPTION OF EMBODIMENTS

In the following, embodiments of the present technology are described with reference to the drawings. It is to be noted that the embodiments described below are preferred, specific examples of the present technology and are subject to various, technically favorable limitations. However, unless otherwise stated to limit the present technology in the following description, the scope of the present technology shall not be limited to such embodiments.

Figure 1:
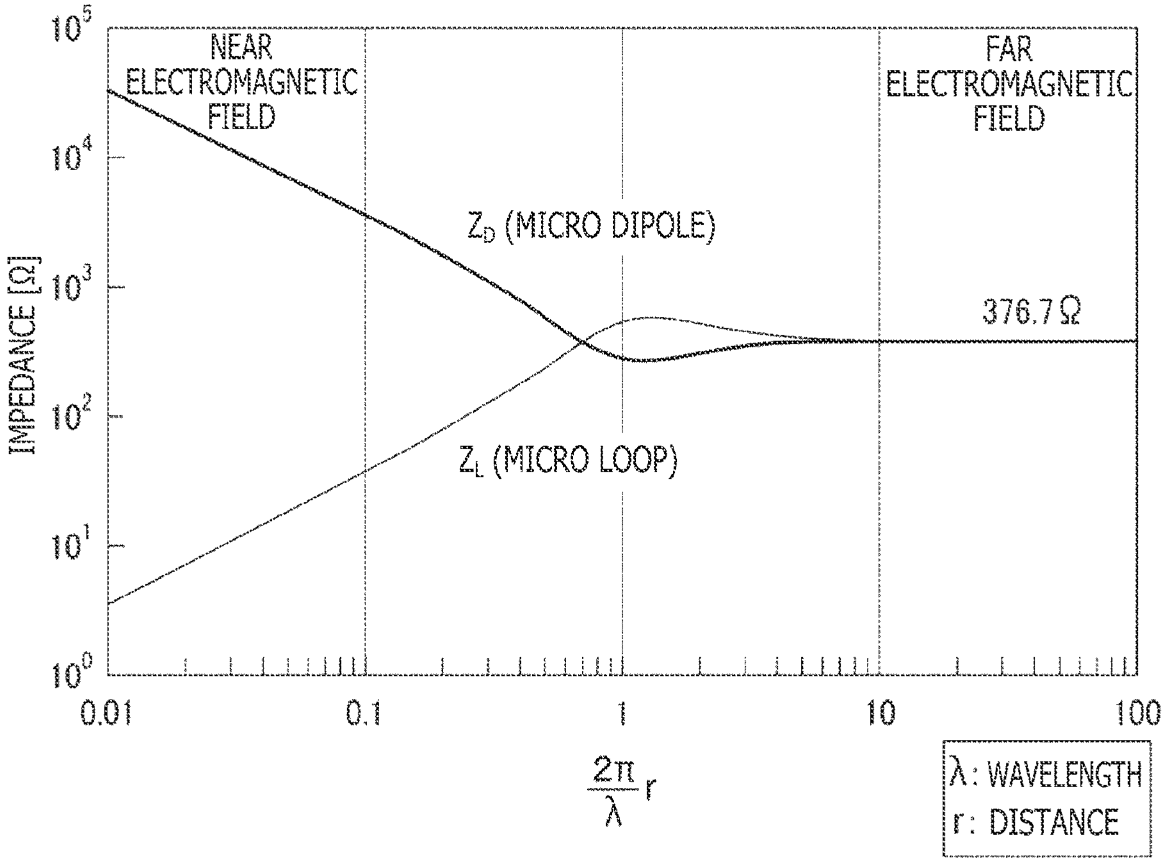
FIG. 1 is a graph used for explaining a near field and a far field.

In a case where an electromagnetic shield is used near an antenna, the effect of the shield changes depending upon the wave impedance. The wave impedance is a ratio (E/H) between an electric field (E) and a magnetic field (H) at a certain place. FIG. 1 is a graph depicting a change in wave impedance with respect to the distance and depicts a change in wave impedance of a micro dipole antenna and a micro loop antenna. Near the dipole antenna, since the electric field is strong, the wave impedance is high. On the other hand, near the loop antenna, since the magnetic field is strong, the wave impedance is low. If the distance exceeds $\lambda$ (electromagnetic field wavelength)/($2\pi$), then the wave impedance of both antennas converges to a predetermined value (376.7$\Omega$). Customarily, the electromagnetic field up to this value of $\lambda/(2\pi)$ is called the near field, and the electromagnetic field farther than this value of $\lambda/(2\pi)$ is called the far field.

FIG. 1 depicts the distance r in a state normalized by $\lambda/(2\pi)$, and 1 on the axis of abscissa corresponds to ($r=\lambda/(2\pi)$; and this distance is the boundary between the near field and the far field. For example, in the case of 100 MHz, the boundary distance r=0.48 m, and (0.1) corresponds to (r=4.8 cm) and (10) corresponds to (r=4.8 m). Similarly, in the case of 200 MHz, (1:r=0.24 m), (0.1:r=2.4 cm), and (10:r=2.4 m) hold. Furthermore, in the case of 500 MHz, (1:r=0.095 m), (0.1:r=0.95 cm), and (10:r=0.95 m) hold.

Figure 2:
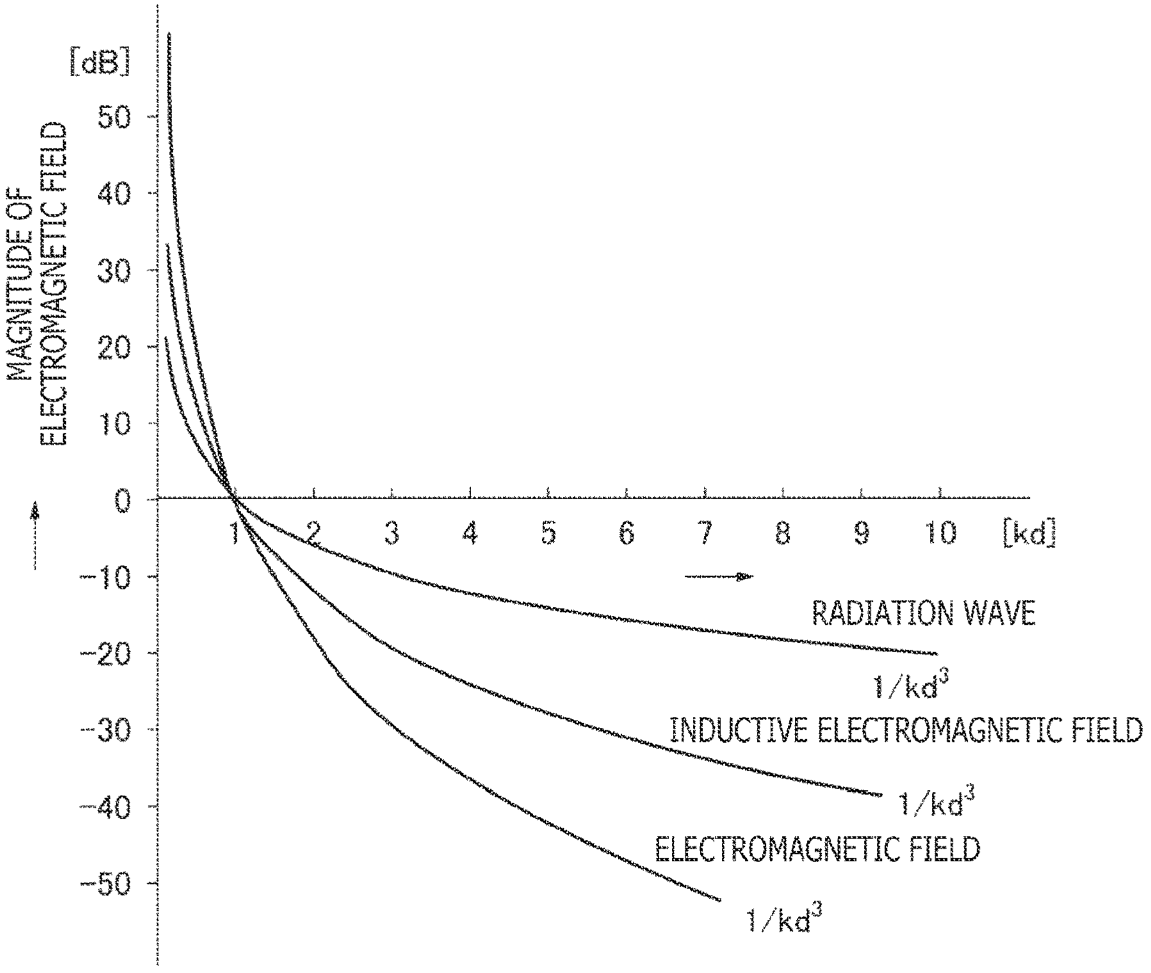
FIG. 2 is a graph depicting a magnitude of an electromagnetic field of a near field.

The graph of FIG. 2 depicts the strength of an electromagnetic field, an induction electromagnetic field, and a radiation wave with respect to the axis of abscissa ($\lambda/(2\pi)$). As can be recognized from the graph of FIG. 2, since the electromagnetic field is fairly strong in the near field, a shield is required as a measure against noise. In order to suppress the influence of noise, it is necessary to reduce the influence of conduction noise transmitted to the cable and spatial noise that enters the cable. Especially, since the magnetic field component is low in impedance, there is a challenge that noise removal of the magnetic field component is difficult.

Figure 3:
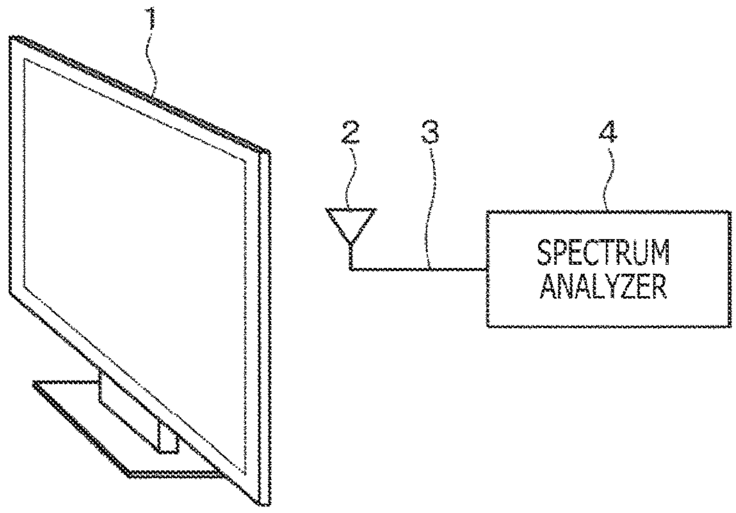
FIG. 3 is a schematic diagram illustrating a method of measuring noise in the proximity of a television receiver.

Noise components generated from electronic equipment, for example, from a television receiver 1 on the market, were measured. As depicted in FIG. 3, a dipole antenna 2 is installed in the proximity of the back surface of the television receiver 1, and a reception signal of the dipole antenna 2 is supplied to a spectrum analyzer 4 through a cable 3. Noise components (spatial noise) received by the dipole antenna 2 can be analyzed by the spectrum analyzer 4.

Figure 4:
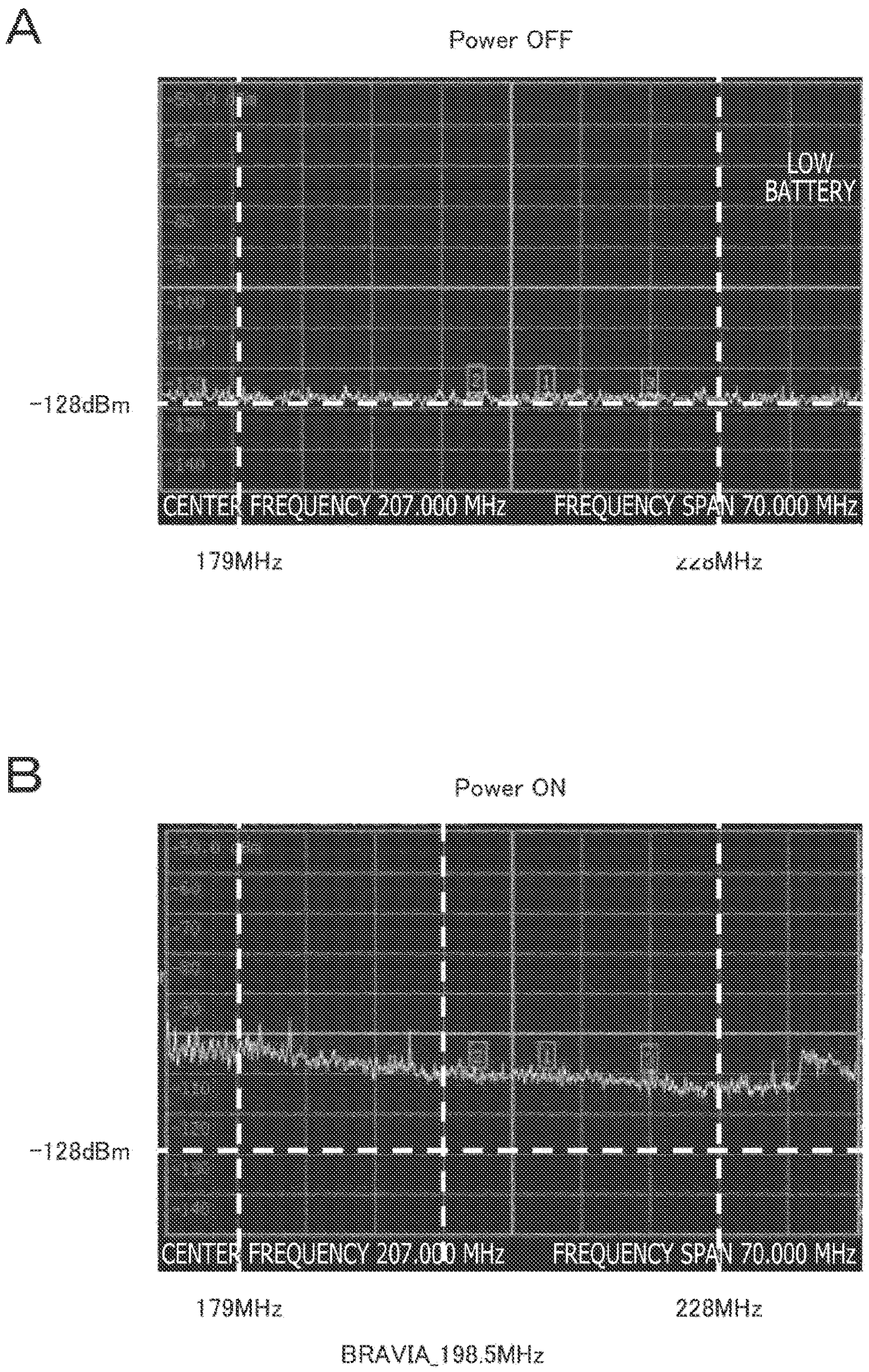
FIGS. 4A and 4B are graphs used for explaining noise in the VHF band high band.
Figure 5:
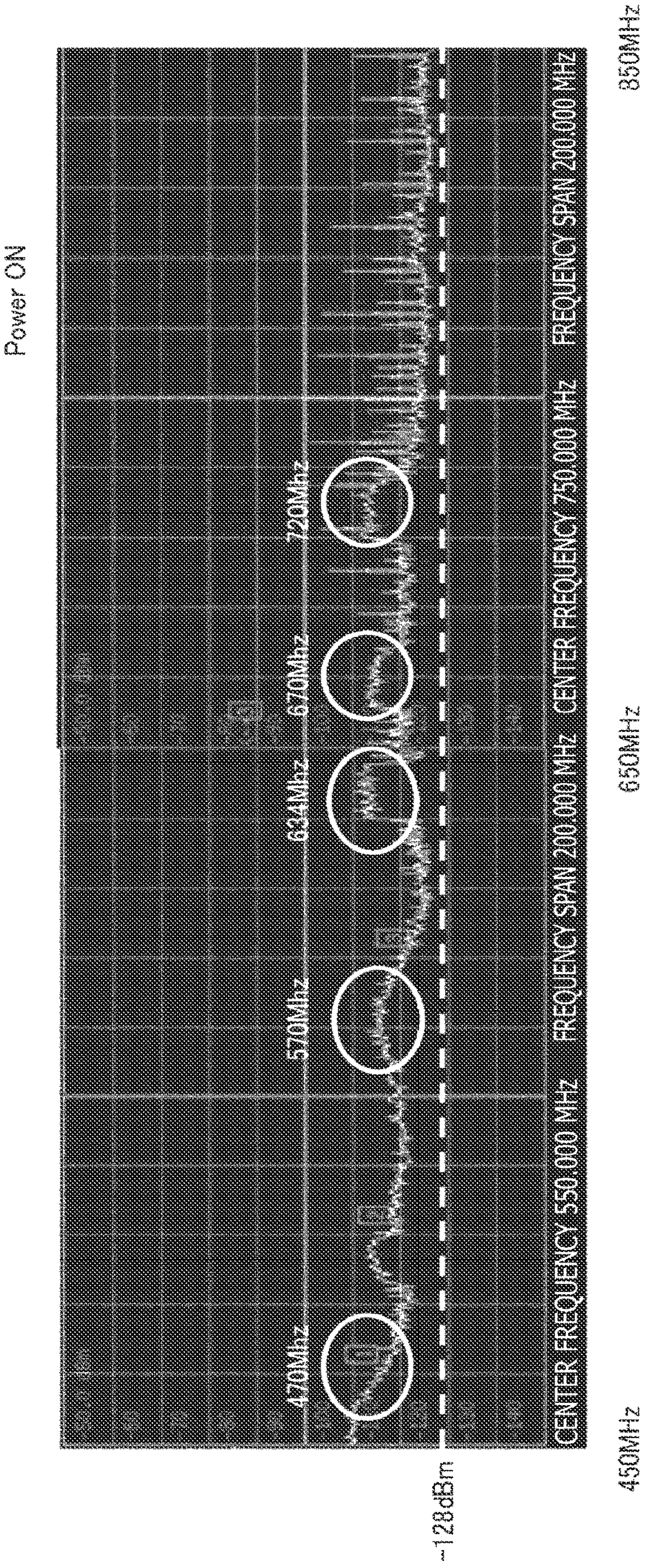
FIG. 5 is a graph used for explaining noise in the UHF band.

FIGS. 4A and 4B depict the level of noise components of the VHF band high band (179 to 228 MHz) obtained by the configuration depicted in FIG. 3. In a case where the power supply to the television receiver 1 is OFF, the level of noise components is fairly low as depicted in FIG. 4A. On the other hand, in a case where the power supply to the television receiver 1 is ON, the level of the noise signal becomes high as depicted in FIG. 4B. FIG. 5 depicts a frequency distribution of the noise signal in the UHF band (450 to 850 MHz) in a case where the power supply to the television receiver 1 is ON. Also in the UHF band, noise components are high as in the VHF band.

Figure 6:
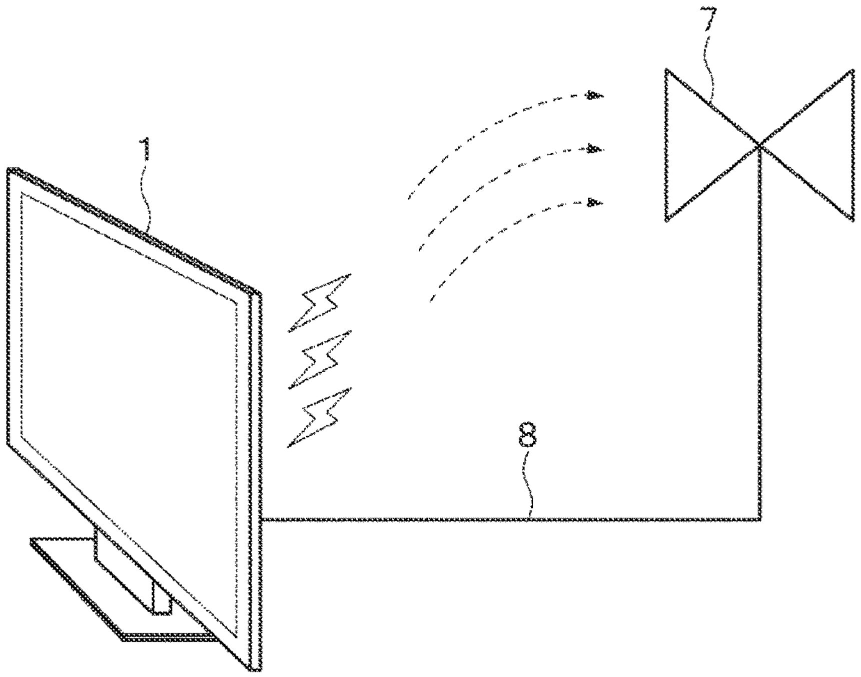
FIG. 6 is a schematic diagram illustrating noise of a television receiver with respect to an indoor antenna.

Especially, in a case where an indoor antenna, for example, a balanced type antenna 7, is connected to the television receiver 1 through a coaxial cable 8 as depicted in FIG. 6, in order to minimize the influence of such noise components as described above (spatial conduction noise), the balanced type antenna 7 needs to be spaced away from the television receiver 1. The coaxial cable 8 is connected to the television receiver 1 by an IEC connector or an F connector. The present technology is applied, for example, to the coaxial cable 8. By the present technology, noise that enters the coaxial cable 8 and noise generated from the coaxial cable 8 can be suppressed.

Figure 7:
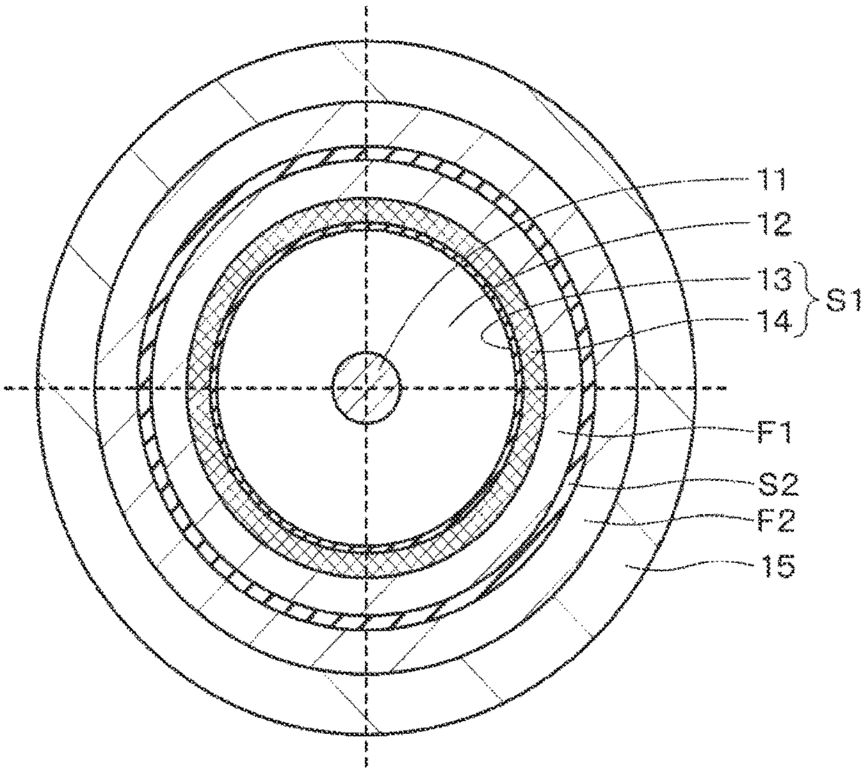
FIGS. 7A and 7B are respectively a cross sectional view and a front elevational view of an embodiment of the present technology.
Figure 7:
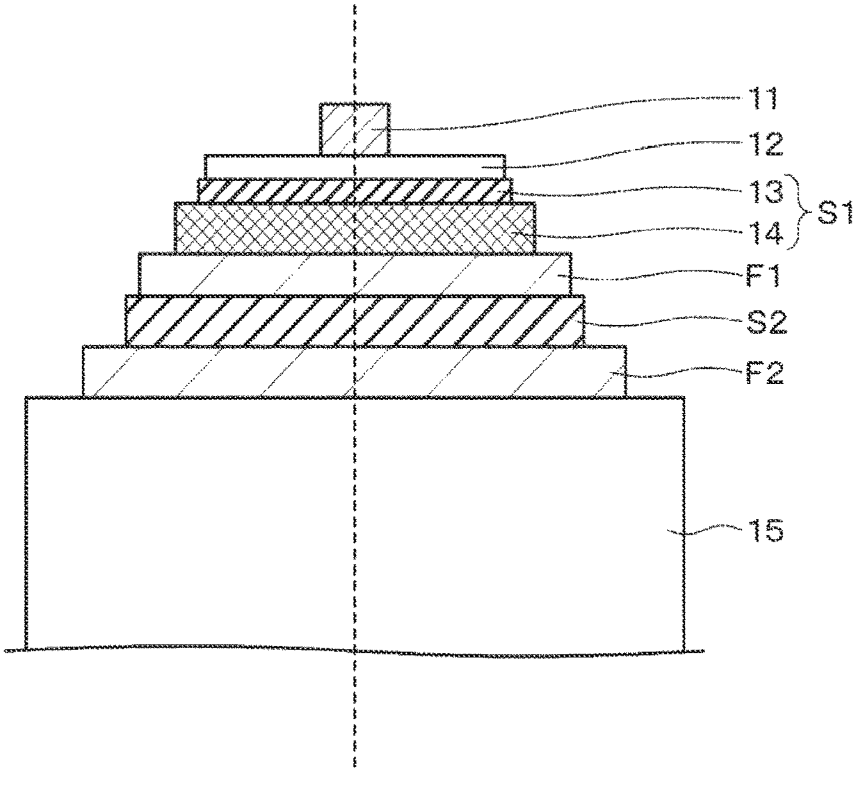

In the following, an embodiment of a cable according to the present technology that makes it possible to suppress magnetic field noise and electric field noise in the near field described hereinabove is described. FIGS. 7A and 7B are respectively a transverse sectional view and a front elevational view of the cable according to the embodiment of the present technology. The front elevational view of FIG. 7B depicts an internal structure of the cable in an easy-to-understand manner by peeling off cover portions in order from the center to the outer periphery aide. The embodiment is an example in which the present technology is applied to a coaxial cable.

A line (central conductor) 11 for signal transmission including, for example, an annealed copper wire is located at the center of the cable. An insulator 12 including, for example, foamed polyurethane, polyethylene, foamed polyethylene, or the like is located on the outer side of the line 11. Around the insulator 12, a first shield portion S1 having a function of an electric field shield is provided in such a manner as to cover the insulator 12. The first shield portion S1 includes, for example, an aluminum sheet 13 arranged on the outer surface of the insulator 12 and a braided wire 14 arranged on the outer surface of the aluminum sheet 13. The first shield portion S1 is not limited to having such a configuration as just described and has a configuration that includes a braided wire formed by braiding an annealed copper wire, another configuration that includes a braided wire and a metal sheet (metal sheet of aluminum, copper, iron, or the like) in the form of foil arranged on the inner side or the outer side of the braided wire, a further configuration that includes windings produced by winding an annealed copper wire, or a still further configuration that includes windings and a metal sheet (metal sheet of aluminum, copper, iron or, the like) in the form of foil arranged on the inner side or the outer side of the windings. It is to be noted that the annealed copper wire may be plated with tin.

The braided wire 14 of the first shield portion S1 is connected to a grounding portion of a circuit in the inside of electronic equipment through a connector and so forth. The first shield portion S1 is provided in order to suppress the influence of noise on the line 11 or in order to suppress noise from being emitted to the outside from the line 11.

A first layer F1 including resin, for example, magnetic powder mixed resin, which absorbs radio waves, is arranged on an outer circumferential portion on the outer side of the braided wire 14 of the first shield portion S1. The first layer F1 has a function of a magnetic shield. In other words, the first layer F1 has a function of serving as a measure against conduction noise. The magnetic powder mixed resin is a mixture of magnetic powder in synthetic resin. An example of the synthetic resin is styrene-based elastomer. A synthetic resin such as olefin-based elastomer or PCV other than the styrene-based elastomer may be used. An example of the magnetic powder is Ni-Zn-based ferrite. The ratio of iron powder or ferrite powder to resin is equal to or higher than 70% but equal to or lower than 98% in weight ratio to the resin. Also it is possible to use, as the magnetic powder, Ni-Cu-Zn-based ferrite, Mn-Zn-based ferrite, soft-magnetism metal-based magnetic powder, copper-based magnetic powder, magnesium-based magnetic powder, lithium-based magnetic powder, zinc-based magnetic powder, iron-based (for example, permalloy) magnetic powder, cobalt-based magnetic powder, and any other similar magnetic powder.

A second shield portion S2 having a function of an electric field shield is arranged in such a manner as to cover the outer circumference of the first layer F1. The second shield portion S2 is, for example, an aluminum sheet. Other than the aluminum sheet, only braided wires or only windings may be used. Further, a combination of braided wires or windings and a metal sheet of aluminum or the like may be used. The second shield portion S2 need not be grounded.

A second layer F2 including resin, for example, magnetic powder mixed resin, which absorbs radio waves, is arranged on an outer circumferential portion on the outer side of the second shield portion S2. The second layer F2 having a function of a magnetic shield is provided as a measure against spatial noise. The outer circumferential portion on the outer side of the second layer F2 is covered with a covering material 15. The covering material 15 can be formed using an insulating material such as, for example, polyethylene, polypropylene, PVC (polyvinyl chloride), or elastomer.

Generally, the complex magnetic permeability is represented by a real part of an inductance component and an imaginary part corresponding to a resistance component (loss component) as represented by the following expression.

$$\dot{\mu}=\mu-j\mu'' \quad \text{[Math. 1]}$$

In a case where the first layer F1 and the second layer F2 are compared with each other, the first layer F1 has a function of converting noise into heat by a high frequency resistance indicated by the imaginary part, and the second layer F2 has a function of a magnetic shield that suppresses the influence of a magnetic field by the inductance component indicated by the real part. That is, noise coming onto the outer cover of the braided wire 14 of the first shield portion S1 is prevented by the high frequency impedance of the ferrite of the first layer F1 on the inner side. Further, the influence of noise from the outside (spatial conduction noise) can be prevented by a magnetic shield formed by the second layer F2. Even if the thickness of the first layer F1 is not made great, since the effect of the ferrite depends upon its volume, the high frequency resistance of the cable becomes higher, and noise of the braided wire 14 of the first shield portion S1 that could be caused to the outer cover can be suppressed.

The influence on such equipment as an electronic circuit (immunity side) from a generation source of noise (emission side) and the noise suppression function by the present technology are described with reference to FIG. 8. As a type of noise disturbance, there are conductor conduction by which noise is conducted to the equipment side through a conductor, spatial conduction by which noise is conducted to the equipment side through the space, conductor-space conduction by which noise is conducted to the equipment side through the conductor and then the space, and space-conductor conduction by which noise is conducted to the equipment side through the space and then the conductor. In a case where the equipment is an antenna, the equipment needs to be spaced away from a television receiver as a source of generation of noise, by a necessary distance (in the case of 200 MHz, preferably 2.4 m or more). In a case where the equipment is not an antenna, the equipment needs to be shielded.

Figure 8:
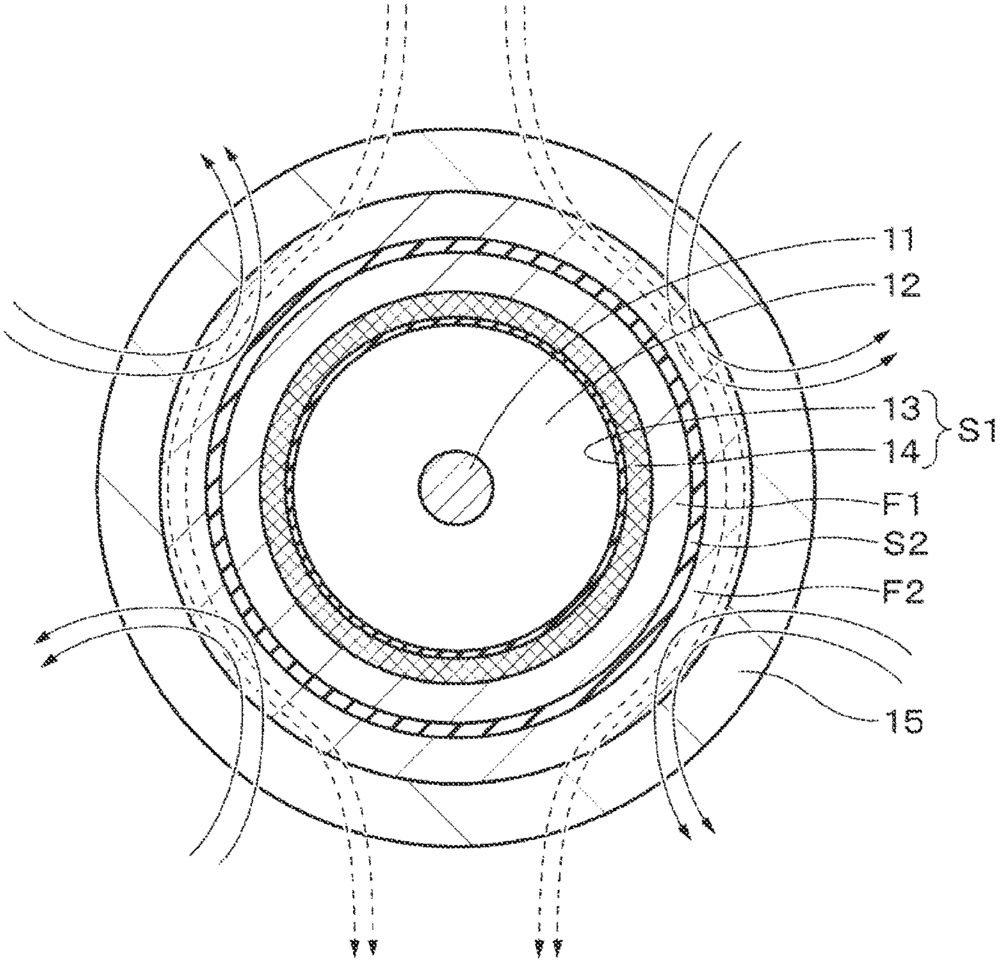
FIG. 8 is a schematic diagram used for explaining a noise suppression effect by the embodiment of the present technology.

Referring to FIG. 8, a solid line arrow mark indicates an electric field component of noise, and a broken line arrow mark indicates a magnetic field component of noise. The second shield portion S2 can reflect the electric field component of noise, and the second layer F2 can suppress the magnetic field component of noise. In particular, the influence of noise caused by spatial conduction of the near field can be moderated by the second shield portion S2 and the second layer F2. Further, noise to flow into the first shield portion S1 connected to the ground of the equipment (noise by the conductor conduction and noise by the conductor-space conduction) can be suppressed by the first layer F1.

Figure 9:
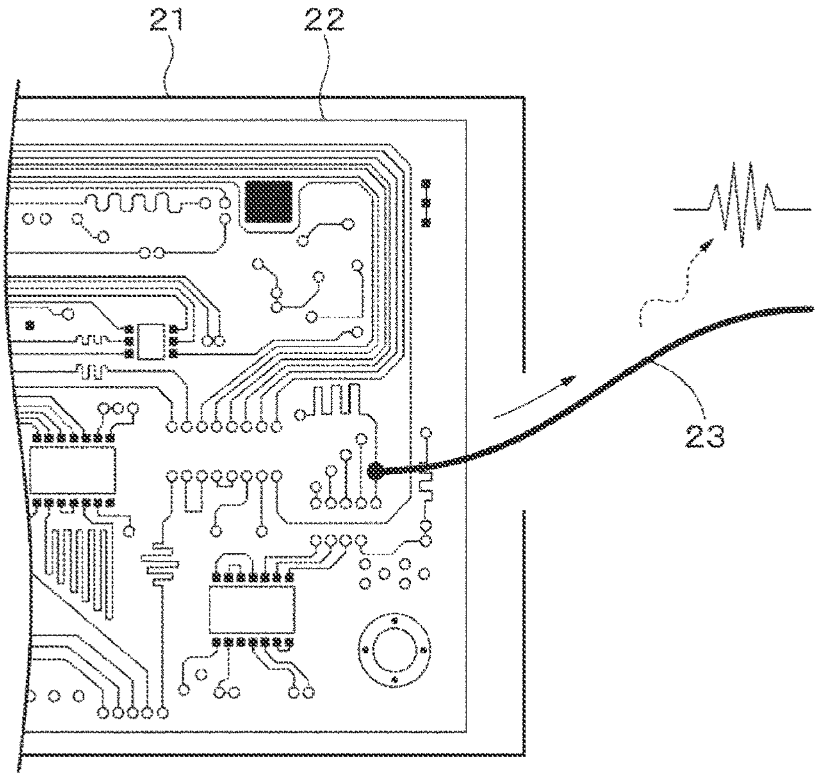
FIGS. 9A and 9B are schematic diagrams for explaining generation of noise.
Figure 9:
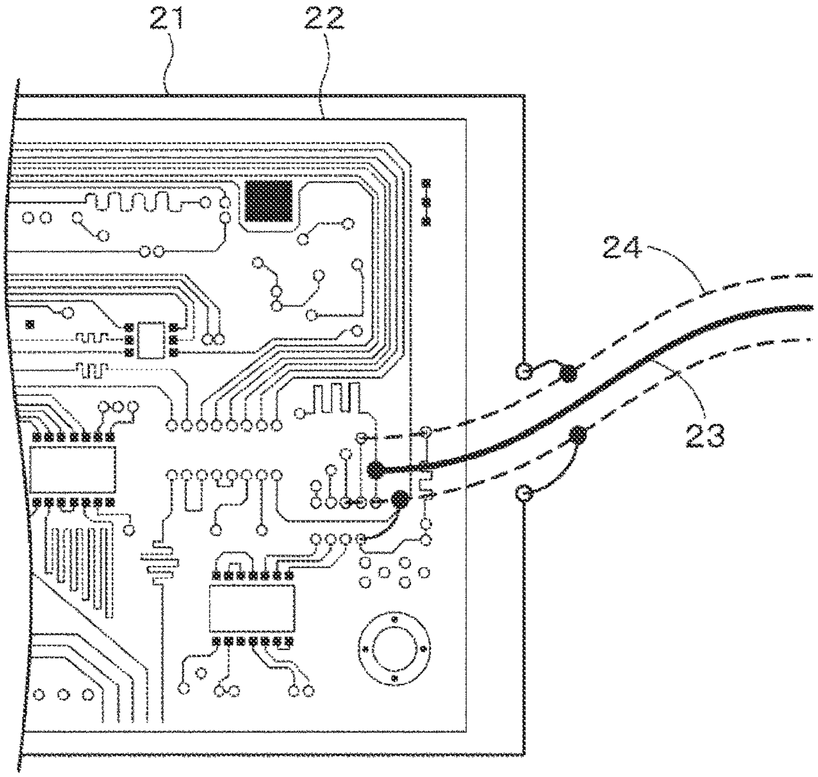

A conventional measure against a noise generation source is described with reference to FIGS. 9A and 9B. Even in a case in which a circuit board 22 is accommodated in a shield case 21 as depicted in FIG. 9A, noise by conductor conduction that conducts a line 23 that comes into and goes out from the shield case 21 is generated, and noise by the spatial conduction is generated by the line 23 that serves as an antenna. In such a manner, even if an effort is made to remove noise by the spatial conduction by the shield case 21, noise is generated by the line 23 that comes into and goes out from the shield case 21.

As a measure against this, such a configuration that, as depicted in FIG. 9B, a shield cable 24 (indicated by a broken line) that covers the line 23 is provided and the shield cable 24 is connected to the circuit ground of the circuit board 22 and also to the housing shield ground of the shield case 21 has been used. In a case where the circuit ground is in a sufficiently stable state, only is it necessary to connect the shield cable 24 to the circuit ground. In a case where the shield cable 24 is connected only to the housing shield ground, it is necessary to separately provide a wiring for connecting the housing and the circuit ground to each other as a wiring for a signal. However, even with such countermeasures as just described, the noise suppression effect is insufficient.

Figure 10:
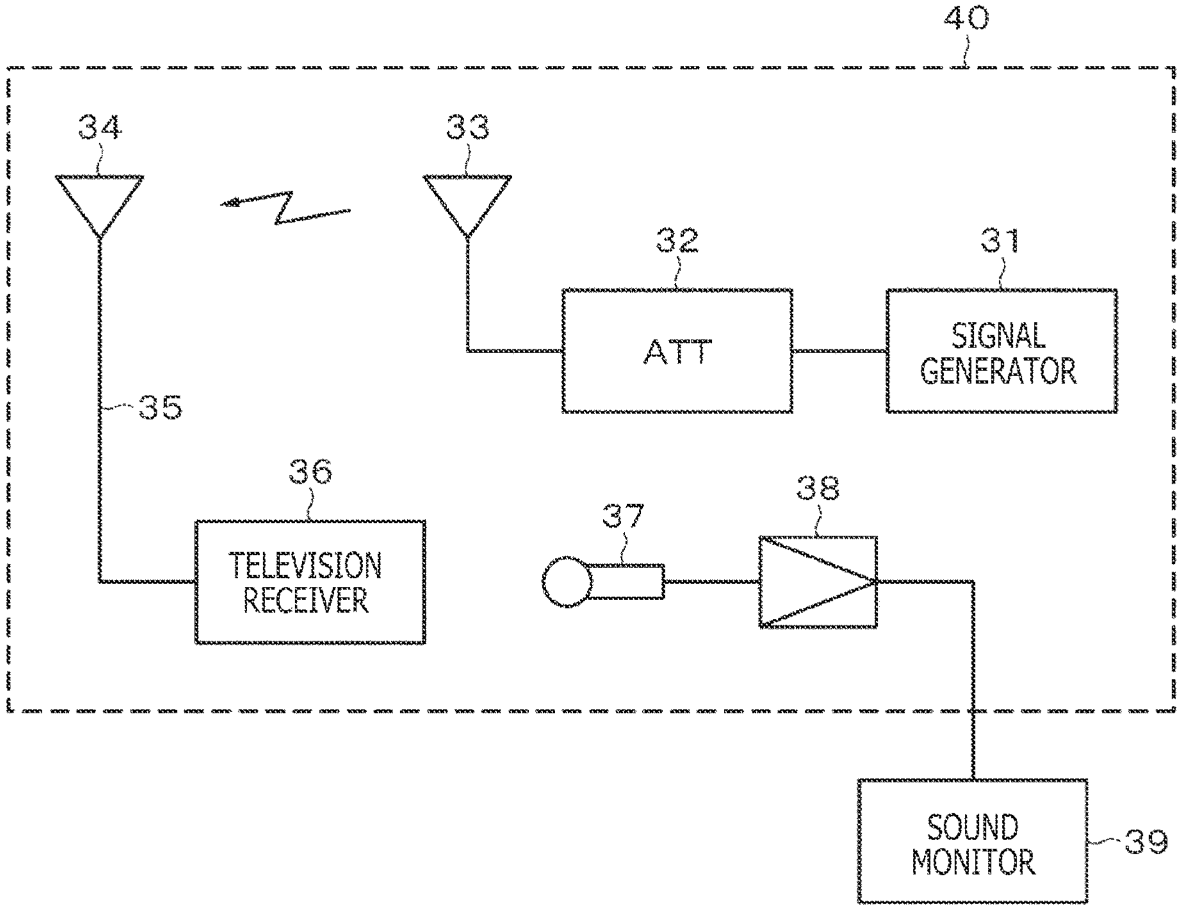
FIG. 10 is a block diagram depicting a system configuration for sensitivity evaluation.

The performance of noise suppression by the present technology was evaluated by a system configured in such a manner as depicted in FIG. 10. A testing signal (for example, a DVB-T2 mode) is generated by a signal generator 31, the signal level of the testing signal is changed by an attenuator 32, and then the testing signal is transmitted by a transmission antenna 33. A reception antenna 34 having a configuration of a balanced type antenna is provided at a position spaced by a predetermined distance from the transmission antenna 33, and a reception signal of the reception antenna 34 is supplied to a television receiver 36 through, for example, a coaxial cable 35 of 1.3 m long and an F connector (or an IECIEC (International Electrotechnical Commission) connector). As the length of the coaxial cable 35, a length equal to or greater than 1 m is preferable in order to reserve amounts of magnetic powder necessary for noise suppression, by which the magnetic powder is individually included in the first layer F1 and the second layer F2.

The level of the transmission signal that can be received in a case where the level of the transmission signal is gradually lowered by the attenuator 32 is measured. As the measurement signal, for example, a sound signal is used. A microphone 37 that detects output sound of the television receiver 36 is used, and an output signal of the microphone 37 is amplified by an amplifier 38 and is monitored by a sound monitor (for example, a speaker) 39 on the outside of a darkroom (indicated by a surrounding broken line) 40. Not the sound, but an image may be monitored using an imaging device in place of the microphone 37.

Figure 11:
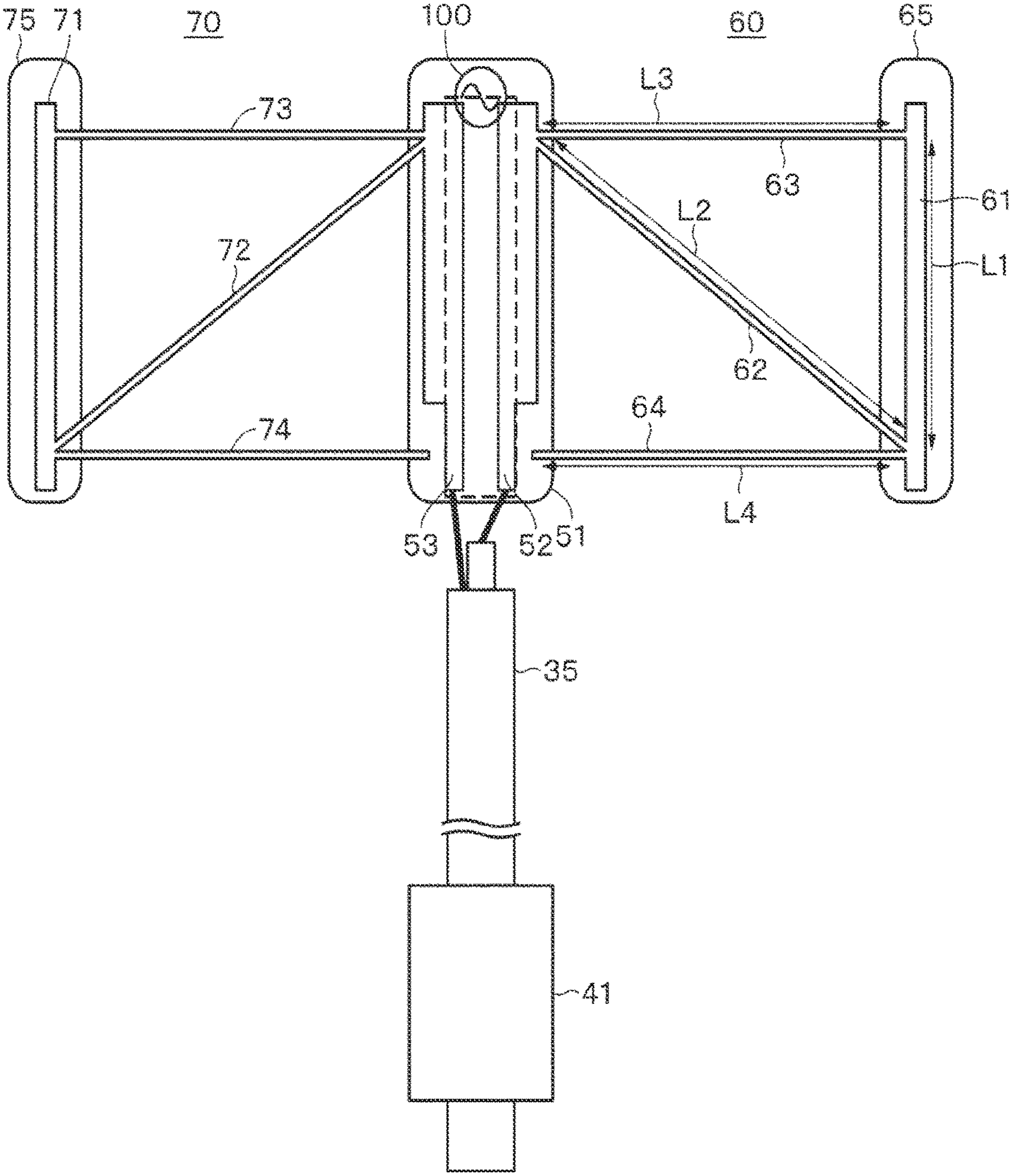
FIG. 11 is a front elevational view depicting a configuration of an example of a reception antenna.

An example of the reception antenna 34 is depicted in FIG. 11. As a balanced transmission path, two wires 52 and 53 are provided in parallel to each other on an insulating board 51. The wire 52 is connected at one end thereof to the central conductor (core line) of the coaxial cable 35, and the wire 53 is connected at one end thereof to an external conductor (braided wire) of the coaxial cable 35. The coaxial cable 35 is connected to a tuner of the television receiver 36 through, for example, an F type connector 41.

Antenna elements 60 and 70 are provided on both sides of the balanced transmission path. The antenna elements 60 and 70 have configurations similar to each other. The antenna element 60 is connected to the other end portion of the wire 52, and the antenna element 70 is connected to the other end portion of the wire 53. The antenna element 60 is configured as an antenna element of a triangular shape by individually connecting end portions of linear elements 61 and 62, end portions of the linear elements 61 and 63, and end portions of the linear elements 62 and 63 to each other.

Also the antenna element 70 is configured similarly as an antenna element of a triangular shape by individually connecting end portions of linear elements 71 and 72, end portions of the linear elements 71 and 73, and end portions of the linear elements 72 and 73 to each other. An apex portion formed by the end portions of the linear elements 72 and 73 is connected to the other end of the wire 53 of the balanced transmission path.

Further, there is provided a linear element 74 which is connected to the linear element 71 of the antenna element of the triangular shape and extends (or is folded back) toward one end portion of the wire 53 of the balanced transmission path. An extension end of the linear element 74 is fixed to the insulating board 51. However, the linear element 74 is not connected to the wire 53. The balanced transmission path and the linear element 74 have impedance matching therebetween.

The lengths (L1, L2, L3, and L4) of the linear elements 61, 62, 63, and 64 and the lengths of the linear elements 71, 72, 73, and 74 are respectively set equal to each other. The lengths are set according to reception frequencies as described hereinabove.

The linear elements 61 to 64 and 71 to 74 are formed using a metal wire including a material that has electric conductivity such as copper, silver, iron or aluminum and that is capable of flexibly changing the shape of the antenna elements 60 and 70. Further, in order to reserve the strength in a case where the material is repeatedly bent or curved in order to change the shape, the material may be configured as a bundled wire in which two or more metal wires are bundled. Further, each of the insulating boards 51, 65, and 75 is a printed circuit board of glass epoxy or ceramic, an FPC (Flexible Printed Circuit), a glass board or a plastic board of molded resin or the like. Furthermore, the insulating boards 51, 65, and 75 may be covered entirely with a case of resin or the like.

The antenna element 70 configures a dipole antenna together with the antenna element 60. Further, a feed point 100 to the antenna device is the other end side of the balanced transmission path (wires 52 and 53), and by appropriately setting the length of the balanced transmission path, an unbalanced transmission line (coaxial cable 35) can be connected to a balanced load (antenna device) without using a balun. By interposing the balanced transmission path, it is possible to adjust the phase and achieve a wider broadband.

With the antenna device described above, a wider broadband can be implemented by setting the length of each of the linear elements of the antenna elements 60 and 70 to a value corresponding to a reception frequency. In particular, in order to receive the high band (200 MHz band) of the VHF band, the length of (L3+L1+L4) or (L2+L4) is set to approximately (¼) of the wavelength (λ1) of the frequency band, for example, to approximately 38 cm. Further, in order to receive the band (470 Hz to 800 MHz) of a terrestrial digital television of the UHF band, the length of L3 or L2 is set to approximately (¼) of the wavelength (λ2) of the frequency band, for example, to approximately 16 cm. The lengths L1 to L4 are values including a wavelength shortening rate.

Figure 12:
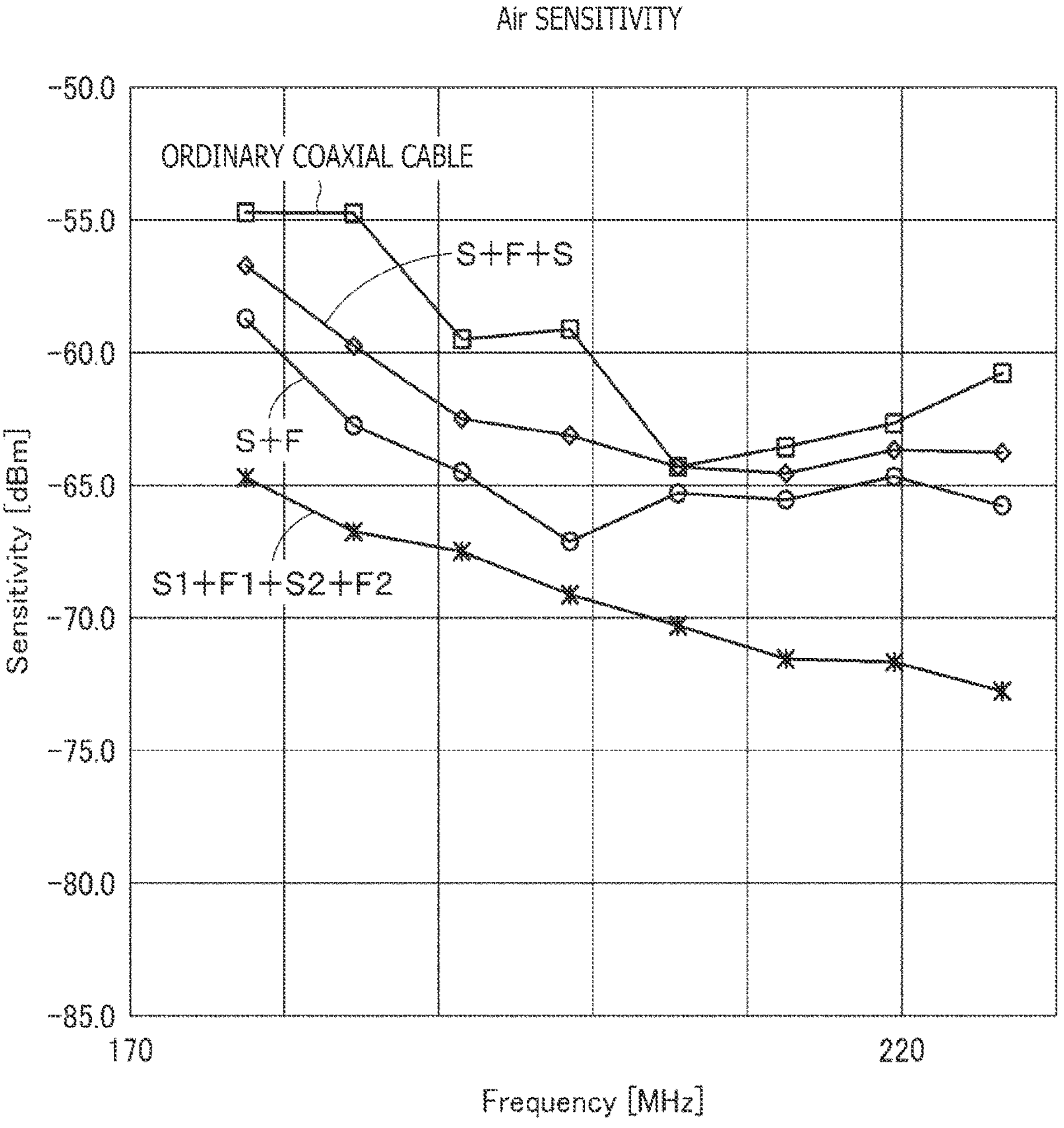
FIG. 12 is a graph depicting a result of sensitivity evaluation of the VHF band high band.
Figure 13:
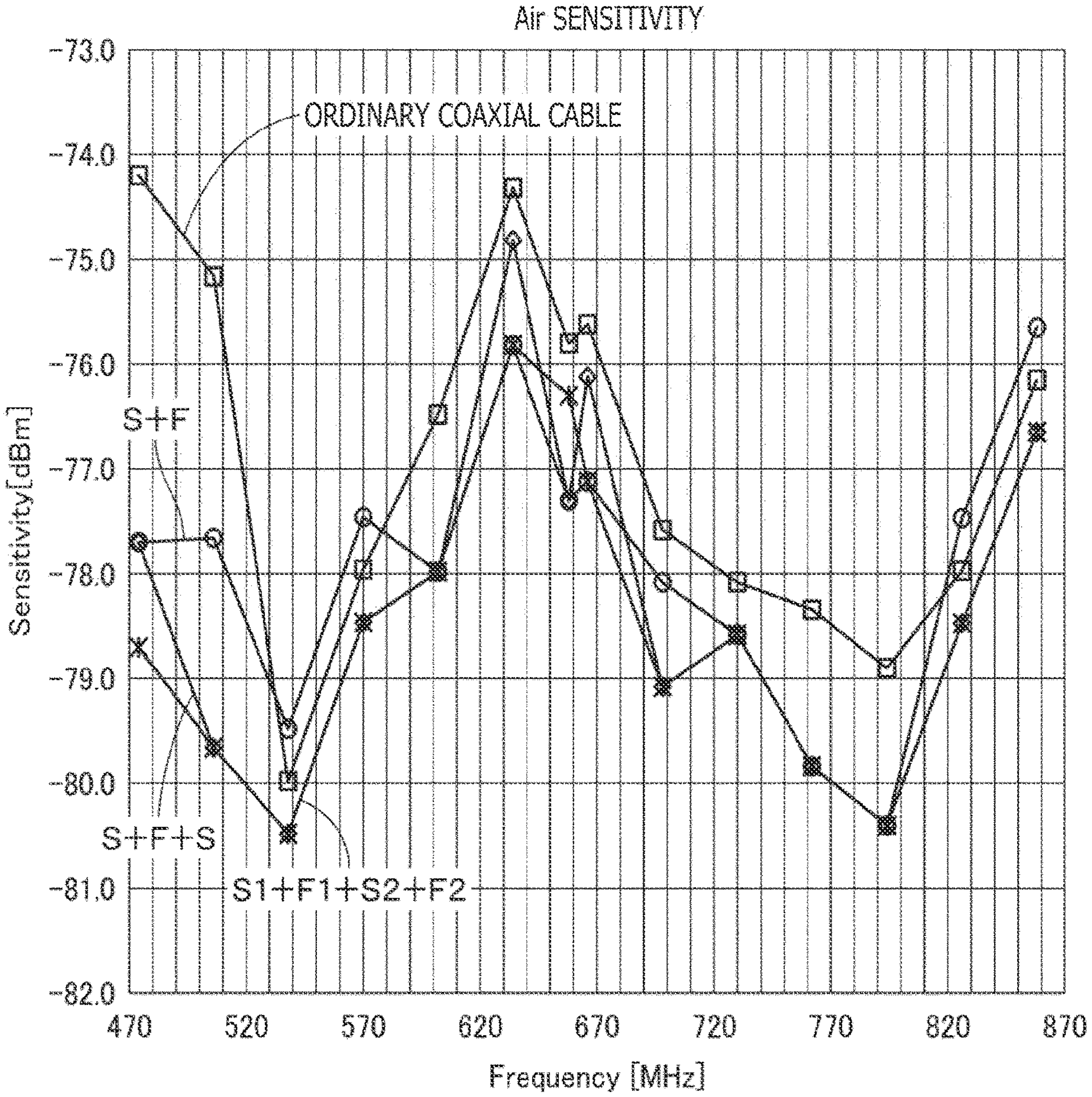
FIG. 13 is a graph depicting a result of sensitivity evaluation of the UHF band.

Results of reception sensitivity evaluation performed by such a system as depicted in FIG. 10 are depicted in FIGS. 12 and 13. FIG. 12 is a graph depicting the reception sensitivity evaluation of the VHF band high band (179 to 228 MHz), and FIG. 13 is a graph depicting the reception sensitivity evaluation of the UHF band (450 to 850 MHz). In the graphs, the axis of abscissa indicates the frequency, and the axis of ordinate indicates the sensitivity, and a lower value on the axis of ordinate indicates better sensitivity.

The graphs of FIGS. 12 and 13 represent each sensitivity in a case where the type of the coaxial cable 35 is changed. In particular, the sensitivity regarding an ordinary coaxial cable, a coaxial cable of the S+F configuration, a coaxial cable of the S+F+S configuration, and a coaxial cable of the S1+F1+S2+F2 configuration (configuration of the present technology) is depicted. It is to be noted that S, S1, and S2 represent shield portions while F, F1, and F2 represent resin layers in which magnetic powder of ferrite or the like is mixed, and they are described following the order from the center to the outer side of the cable.

From the graph of FIG. 12, it can be recognized that the coaxial cable to which the present technology is applied has a characteristic of the highest sensitivity. The coaxial cable that has a characteristic of the second highest sensitivity is S+F; the coaxial cable that has a characteristic of the third highest sensitivity is S+F+S; and the ordinary coaxial cable has a characteristic of the lowest sensitivity. In a frequency band of the VHF band high band, since the influence of the magnetic field is great, a configuration having a higher magnetic field shield effect indicates a better result.

From the graph of FIG. 13, it can be recognized that the coaxial cable to which the present technology is applied has a characteristic of the highest sensitivity. The coaxial cable that has a characteristic of the second highest sensitivity is S+F+S; the coaxial cable that has a characteristic of the third highest sensitivity is S+F; and the ordinary coaxial cable has a characteristic of the lowest sensitivity. In a frequency band of the UHF band, since the influence of the electric field is great, a configuration having a higher electric field shield effect indicates a better result.

The foregoing description is directed to the embodiment in which the present technology is applied to a coaxial cable. The present technology can be applied also to a cable other than a coaxial cable. Cables to which the present invention can be applied will be described.

Figure 14:
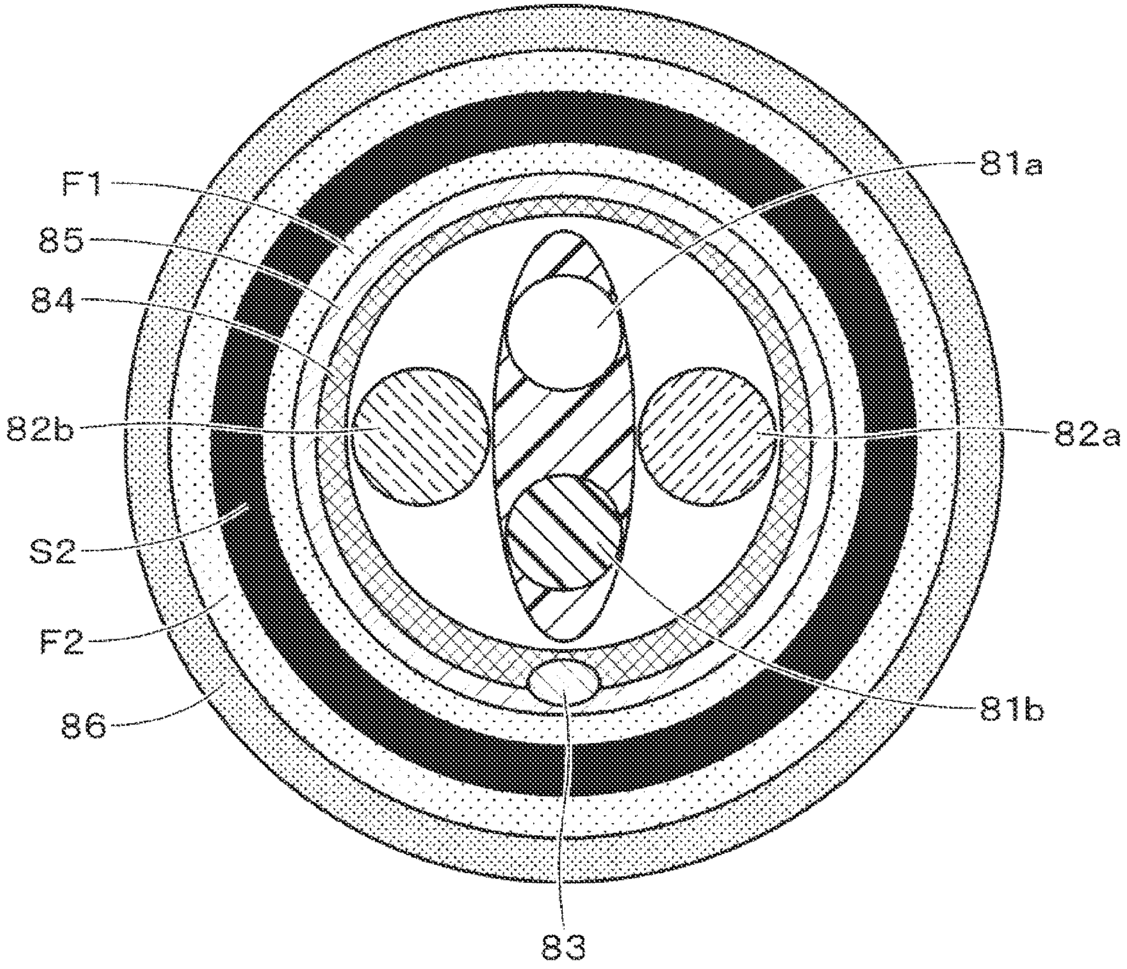
FIG. 14 is a cross sectional view of a USB 2.0 cable to which the present technology is applicable.

FIG. 14 is a cross sectional view of a USB 2.0 cable. The USB cable includes five wires including a set of signal cables 81*a* (D−) and 81*b* (D+) for differential transmission, power supply cables 82*a* and 82*b*, and a drain wire 83 as a ground wire. Each of the cables 81*a*, 81*b*, 82*a*, and 82*b* is formed by covering the circumference of a core wire with an insulating coating.

The core wire may be formed using copper and may be formed using any of a configuration of a single wire including a single conductor and another configuration of a strand wire in which thin conductors are stranded into a single conductor. The signal cables 81*a* and 81*b* form a twisted pair cable. The signal cables 81*a* and 81*b* and the power supply cables 82*a* and 82*b* are covered with an aluminum foil shield 84 and a copper wire net shield 85. The drain wire 83 and the aluminum foil shield 84 are electrically connected to each other.

In a case where the present technology is applied to such a USB 2.0 cable as described above, the aluminum foil shield 84 and the copper wire net shield 85 are applied as the first shield portion S1. Further, the first layer F1, the second shield portion S2, and the second layer F2 are provided on the outer circumference side of the first shield portion S1. A cover 86 is provided on the outermost circumference. The USB 2.0 cable to which the present technology is applied can suppress noise.

Figure 15:
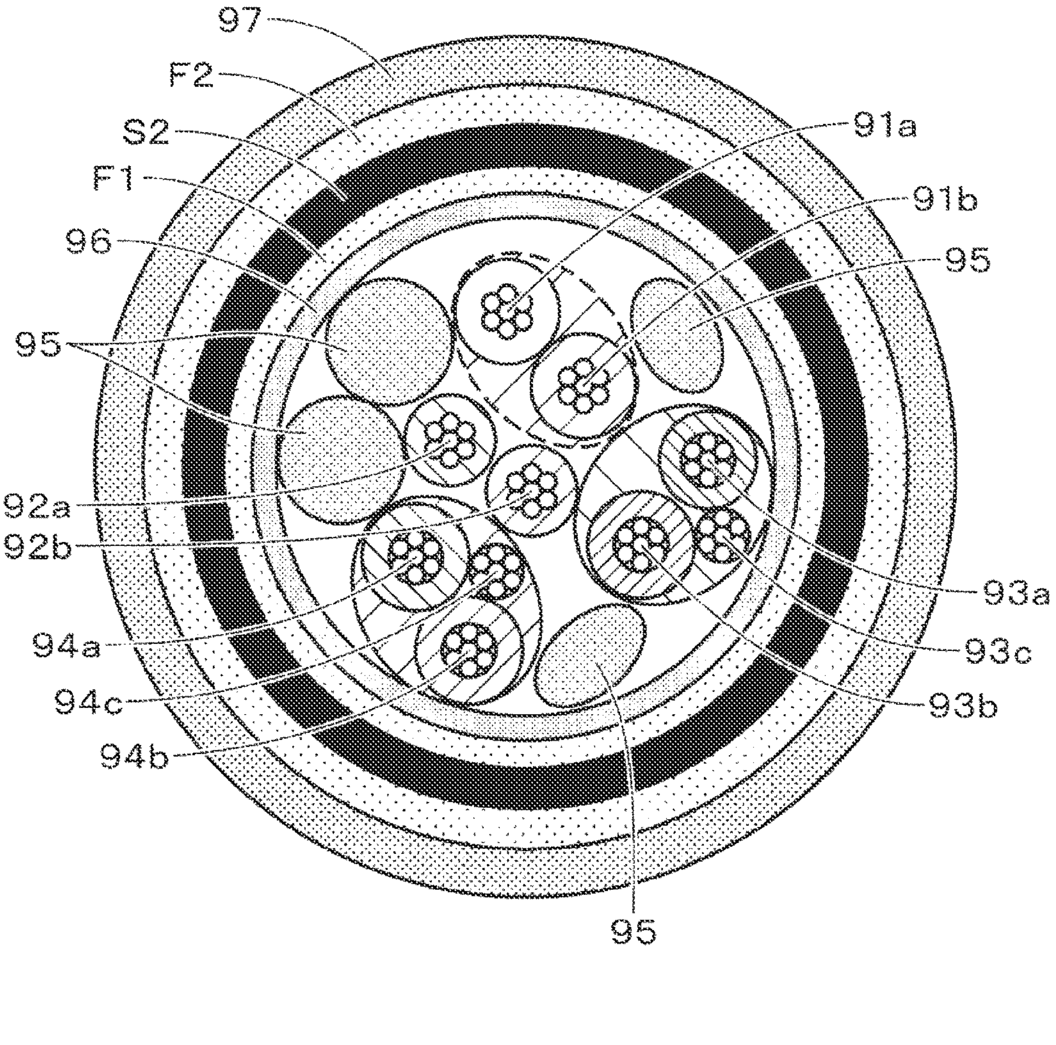
FIG. 15 is a cross sectional view of a USB 3.0 cable to which the present technology is applicable.

FIG. 15 is a cross sectional view of a USB 3.0 cable. As in the USB 2.0 cable, the USB 3.0 cable includes four wires including a set of signal cables 91*a* and 91*b* for differential transmission and power supply cables 92*a* and 92*b*. The signal cables 91*a* and 91*b* are called a UTP (Unshielded Twisted Pair). The USB 3.0 cable further includes signal cables 93*a* and 93*b* and a drain wire 93*c* of USB 3.0 and other signal wires 94*a* and 94*b* and a drain wire 94*c* of USB 3.0. The signal cables 93*a* and 93*b* are called an SDP (Shielded Differential Pair). A filling material 95 is used as an option. The wires and the filling material are covered with a copper wire net shield 96.

In a case where the present technology is applied to such a USB 3.0 cable as described above, the copper wire net shield 96 is applied as the first shield portion S1. Further, the first layer F1, the second shield portion S2, and the second layer F2 are provided in order on the outer circumference side of the first shield portion S1. A cover 97 is provided on the outermost circumference. The USB 3.0 cable to which the present technology is applied can suppress noise.

Figure 16:
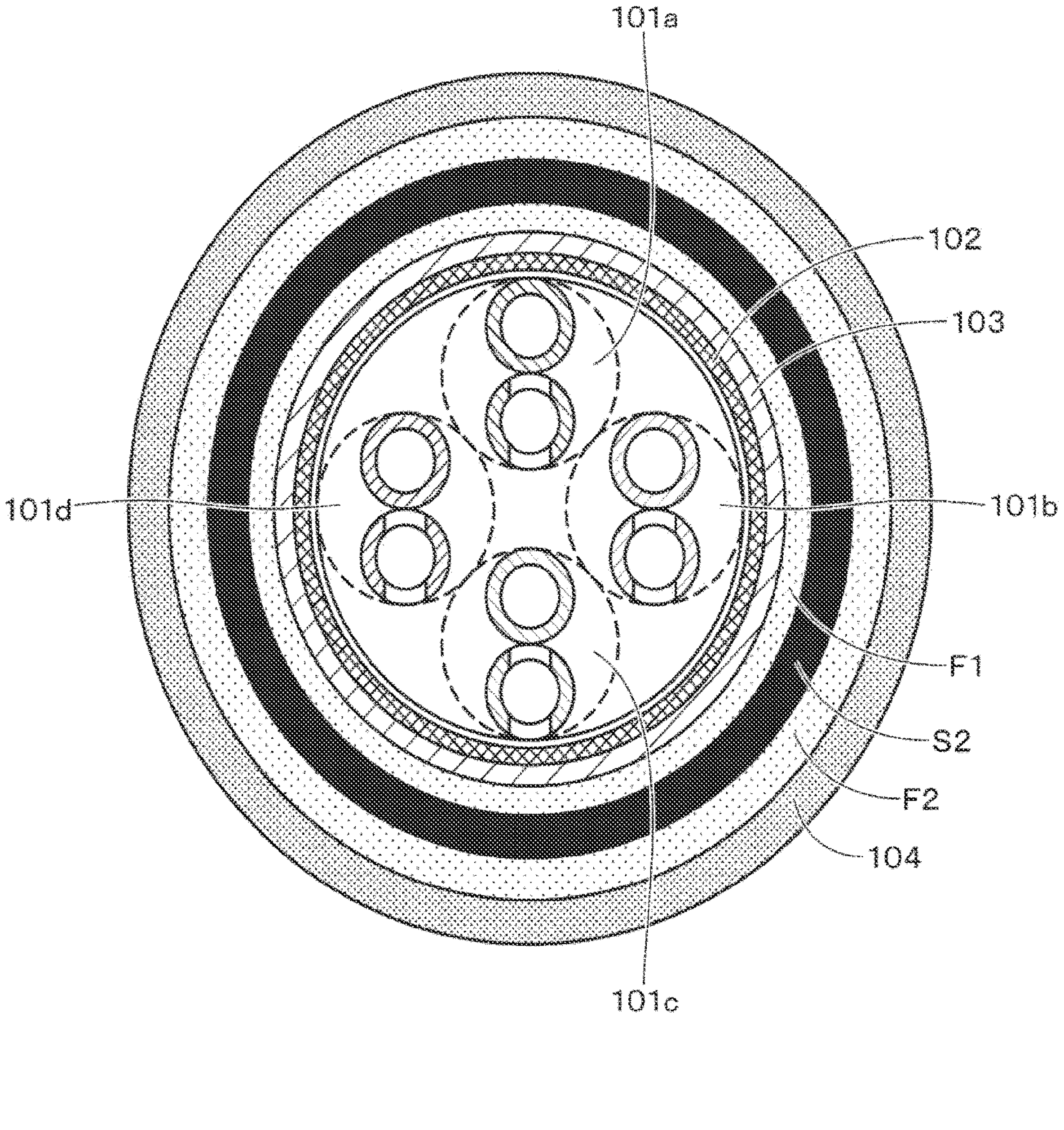
FIG. 16 is a cross sectional view of an Ethernet cable to which the present technology is applicable.

FIG. 16 is a cross sectional view of an Ethernet cable (LAN cable). Four pairs of signal lines 101*a*, 101*b*, 101*c*, and 101*d* of a twisted pair cable configuration are covered with a shield. The shield includes a shield portion 102 of aluminum/PET and a braided wire 103 that are layered from the inner side.

In a case where the present technology is applied to such an Ethernet cable (LAN cable) as described above, the shield portion 102 of aluminum/PET and the braided wire 103 are applied as the first shield portion S1. Further, the first layer F1, the second shield portion S2, and the second layer F2 are provided in order on the outer circumference side of the first shield portion S1. A cover 104 is provided on the outermost circumference. The Ethernet cable (LAN cable) to which the present technology is applied can suppress noise.

Figure 17:
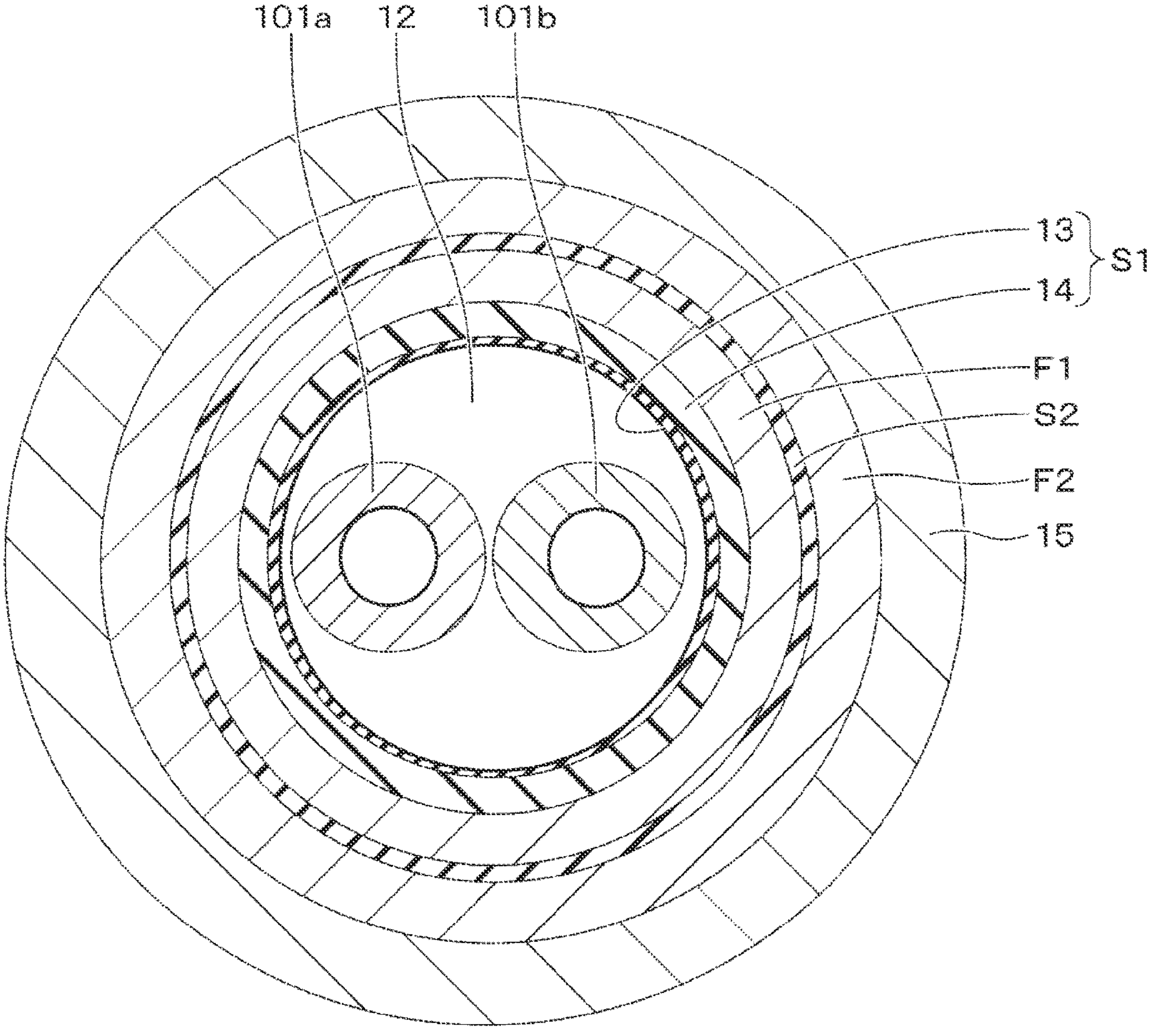
FIG. 17 is a cross sectional view of a modification of the present technology.

FIG. 17 is a cross sectional view of a modification in which the present technology is applied to a cable that includes two wires 110*a* and 110*b*. Each of the wires 110*a* and 110*b* is a power supply cable including signal transmission wires or two wires of a hot line and a ground line. The wires 110*a* and 110*b* have a shield configuration similar to that of the embodiment depicted in FIG. 7. In particular, an insulator 12 including, for example, foamed polyurethane, polyethylene, foamed polyethylene or the like is located on the outer side of the wires 110*a* and 110*b*. Around the insulator 12, a first shield portion S1 having a function of an electric field shield is provided in such a manner as to cover the insulator 12. The first shield portion S1 includes, for example, an aluminum sheet 13 arranged on the outer surface of the insulator 12 and a braided wire 14 arranged on the outer surface of the aluminum sheet 13. The first shield portion S1 is not limited to having such a configuration as just described and has a configuration that includes a braided wire formed by braiding an annealed copper wire, another configuration that includes a braided wire and a metal sheet (metal sheet of aluminum, copper, iron, or the like) in the form of foil arranged on the inner side or the outer side of the braided wire, a further configuration that includes windings produced by winding an annealed copper wire, or a still further configuration that includes windings and a metal sheet (metal sheet of aluminum, copper, iron, or the like) in the form of foil arranged on the inner side or the outer side of the windings.

A first layer F1 including resin, for example, magnetic powder mixed resin, which absorbs radio waves, is arranged on an outer circumferential portion on the outer side of the braided wire 14 of the first shield portion S1. The first layer F1 has a function of a magnetic shield. In other words, the first layer F1 has a function of serving as a measure against conduction noise. The magnetic powder mixed resin is a mixture of magnetic powder in synthetic resin. An example of the synthetic resin is styrene-based elastomer. A synthetic resin such as olefin-based elastomer or PCV other than the styrene-based elastomer may be used. An example of the magnetic powder is Ni-Zn-based ferrite. The ratio of iron powder or ferrite powder to resin is equal to or higher than 70% but equal to or lower than 98% in weight ratio to the resin. Also it is possible to use, as the magnetic powder, Ni-Cu-Zn-based ferrite, Mn-Zn-based ferrite, soft-magnetism metal-based magnetic powder, copper-based magnetic powder, magnesium-based magnetic powder, lithium-based magnetic powder, zinc-based magnetic powder, iron-based (for example, permalloy) magnetic powder, cobalt-based magnetic powder, and any other similar magnetic powder.

A second shield portion S2 having a function of an electric field shield is arranged in such a manner as to cover the outer circumference of the first layer F1. The second shield portion S2 is, for example, an aluminum sheet. Other than the aluminum sheet, only braided wires or only windings may be used. Further, a combination of braided wires or windings and a metal sheet of aluminum or the like may be used. The second shield portion S2 need not be grounded.

A second layer F2 made of resin, for example, magnetic powder mixed resin, which absorbs radio waves, is arranged on an outer circumferential portion on the outer side of the second shield portion S2. The second layer F2 having a function of a magnetic shield is provided as a measure against spatial noise. The outer circumferential portion on the outer side of the second layer F2 is covered with a covering material 15. The covering material 15 can be formed using, for example, an insulating material such as polyethylene, polypropylene, PVC (polyvinyl chloride), or elastomer.

Figure 18:
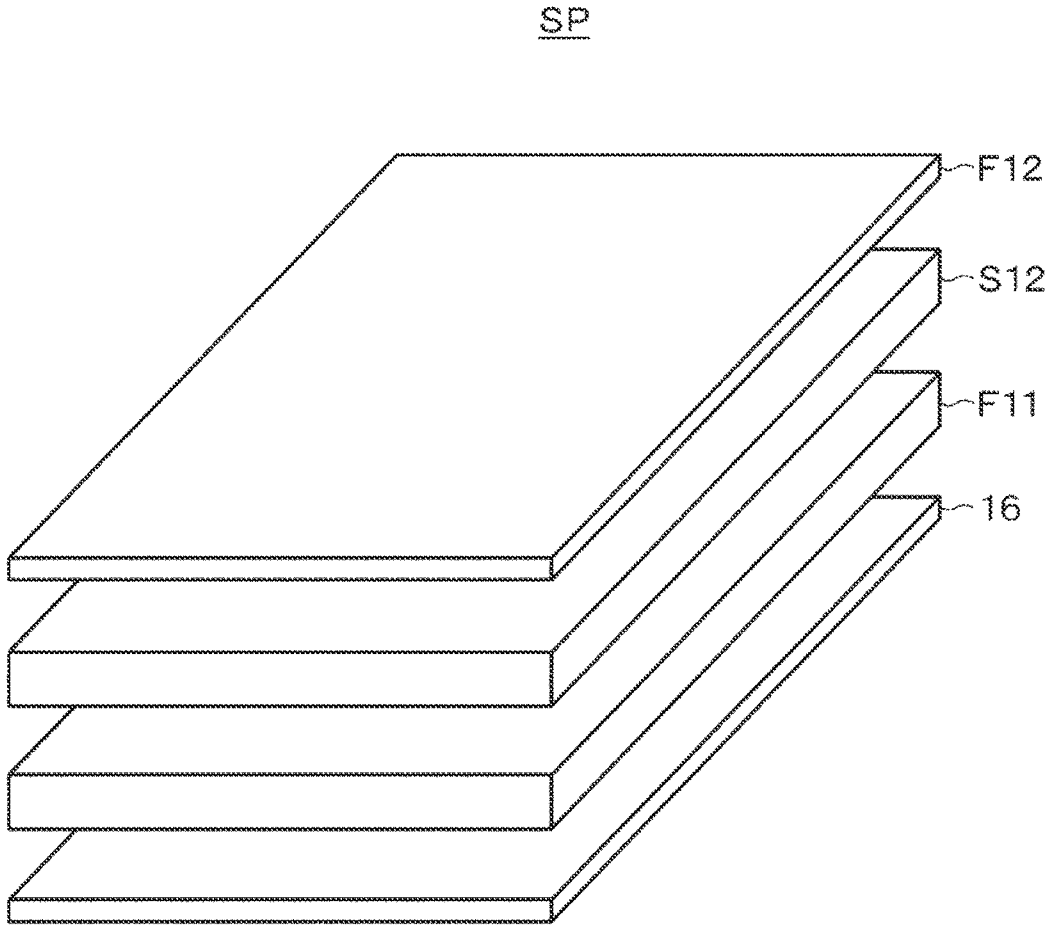
FIG. 18 is a partial perspective view depicting a configuration of another example of a shield member of the present technology.

Modifications of the present technology will be described below. A member provided on the braided wire 14 of the first shield portion S1 is configured as a shield member SP in the form of a sheet or a tape as depicted in FIG. 18. For example, a double-sided adhesive tape 16 is provided on the innermost circumference side, and a magnetic sheet F11 that configures the first layer F1 is stacked on the double-sided adhesive tape 16. A conductive layer S12 that configures the second shield layer S2 is stacked on the magnetic sheet F11. A magnetic sheet F12 that configures the second layer F2 is stacked on the conductive layer S12. It is to be noted that the double-sided adhesive tape 16 may not be provided.

The conductive layer S12 includes a metal foil of aluminum, copper, or the like, and a magnetic material such as iron powder, ferrite powder, or carbon powder is vapor deposited on or applied to opposite surfaces of the metal foil. As an example, the magnetic sheets F11 and F12 have a thickness of 0.05 mm, and the conductive layer S12 has a thickness of 0.03 mm.

Figure 19:
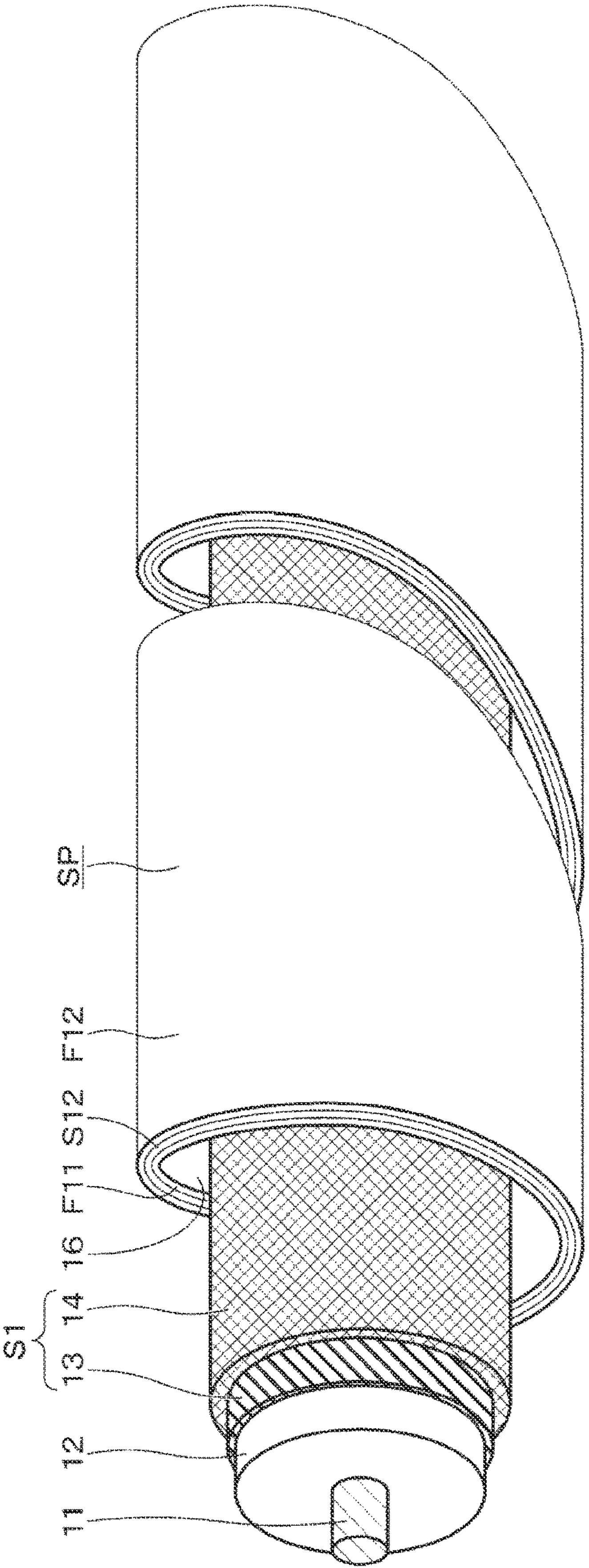
FIG. 19 is a perspective view used for explaining a wrapping method of a further example of the shield member of the present technology.
Figure 20:
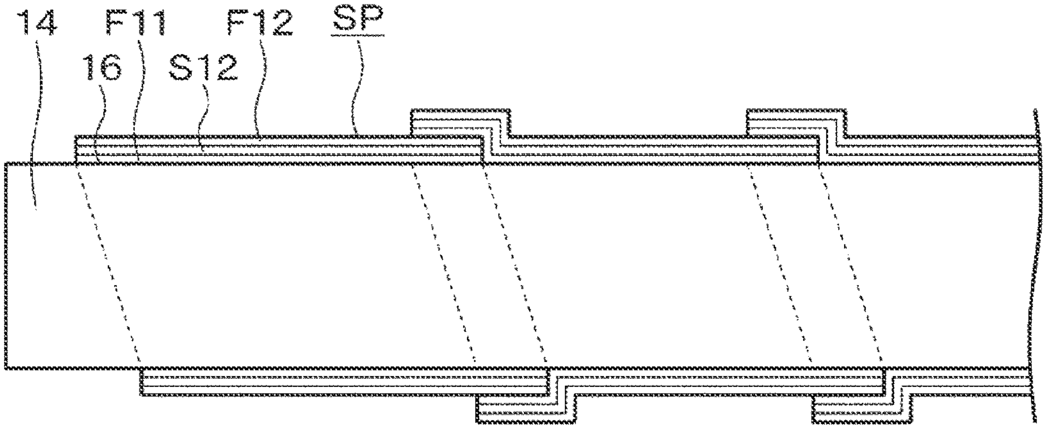
FIG. 20 is a cross sectional view used for explaining the wrapping method of the further example of the shield member of the present technology.

The shield member SP described above is wrapped closely on the outer surface of the braided wire 14 that configures the first shield portion S1 (for example, refer to FIG. 7A), as depicted in FIG. 19. Although, in FIG. 19, a gap is provided between end portions of the shield member SP in order to facilitate understanding, the shield member SP is wrapped on the braided wire 14 such that end portions thereof overlap with each other as depicted in FIG. 20. The outer circumferential surface of the magnetic sheet F12 is covered with a covering material (not depicted). The covering material is, for example, an insulating material such as polyethylene, polypropylene, PVC (polyvinyl chloride), or elastomer.

Figure 21:
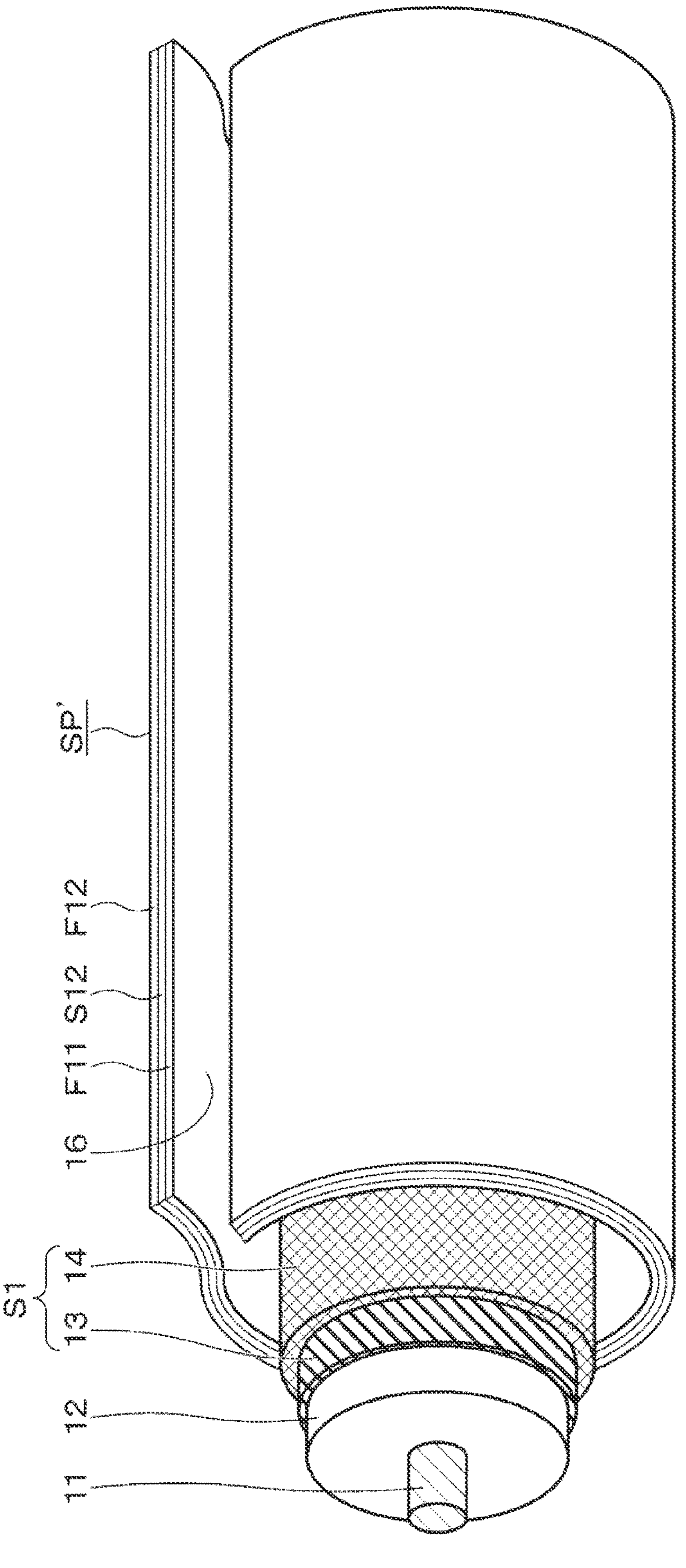
FIG. 21 is a perspective view used for explaining a wrapping method of a still further example of the shield member of the present technology.
Figure 22:
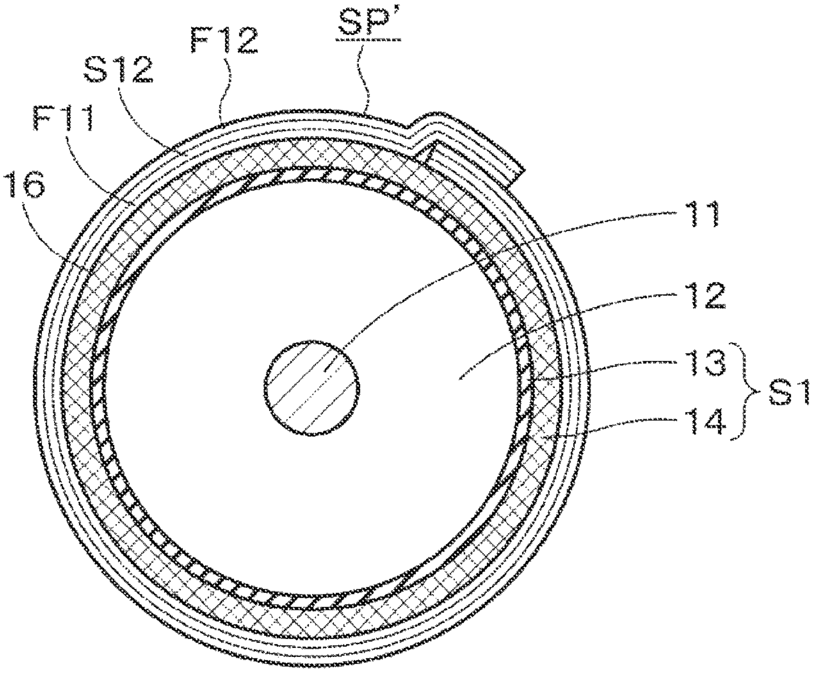
FIG. 22 is a cross sectional view used for explaining a wrapping method of the still further example of the shield member of the present technology.

A shield member SP' in the form of a sheet may be wrapped closely on the braided wire 14 as depicted in FIG. 21. As depicted in FIGS. 21 and 22, end portions in a cable extension direction of the shield member SP' in the form of a sheet are overlapped with each other. In the shield member SP', the magnetic sheet F11 and the magnetic sheet F12 are formed by adhesion of magnetic material to opposite surfaces of the conductive layer S12 by vapor deposition or application, as in the shield member SP. The outer circumferential face of the magnetic sheet F12 is covered with a covering material (not depicted). The covering material is, for example, an insulating material such as polyethylene, polypropylene, PVC (polyvinyl chloride), or elastomer.

The magnetic sheet F11 of the shield member SP or the shield member SP' has a function of serving as a measure against conduction noise, as does the first layer F1 including magnetic powder mixed resin described hereinabove, and the magnetic sheet F12 is provided as a measure against spatial noise, as is the second layer F2. The conductive layer S12 has a function of the second shield portion S2 (function of an electric field shield).

In comparison with the first layer F1 and the second layer F2 in which magnetic powder is mixed in synthetic resin, the magnetic sheet F11 and the magnetic sheet F12 in which a magnetic material is vapor deposited or applied can be improved in magnetic permeability and can be reduced in layer thickness. As a result, the cable can be made thinner and lighter. A small-sized light-weighted cable is preferable as a cable to be used, for example, in a vehicle.

Although the embodiments of the present technology have been described specifically, the present technology is not restricted to the embodiments described above, and various modifications based on the technical idea of the present technology can be made. For example, the configurations, methods, steps, shapes, materials, numerical values, and so forth specified in the embodiments described hereinabove are nothing but examples to the last, and a configuration, a method, a step, a shape, a material, a numerical value, and so forth different from them may be used as occasion demands. For example, the present technology can be applied not only to the cables described above but also to an HDMI (registered trademark) cable, an IEEE (Institute of Electrical and Electronics Engineers) 1394 cable, and so forth.

11: Line
12: Insulator
13: Aluminum sheet
14: Braided wire
S1: First shield portion
F1: First layer
S2: Second shield portion
F2: Second layer
SP, SP': Shield member

The invention claimed is:

1. A cable comprising:

a first shield portion that surrounds at least one or more lines for transmitting a signal or electric power and that is provided on an outer side of the lines;

a first layer that is provided in such a manner as to cover an outer circumference of the first shield portion and that includes resin that absorbs radio waves;

a second shield portion that is provided on an outer side of the first layer;

a second layer that is provided in such a manner as to cover an outer circumference of the second shield portion and that includes resin that absorbs radio waves; and insulating resin that covers an outer side of the second layer, wherein the resin includes a mixture of ferrite powder in resin including PVC or elastomer, wherein, in the resin of the first layer and the resin of the second layer, a ratio of the ferrite powder to the resin is equal to or higher than 70% but equal to or lower than 98% in weight ratio to the resin, and wherein the first shield portion is grounded and the second shield portion is not grounded.

2. The cable according to claim 1, wherein the first shield portion includes a braided wire produced by braiding an annealed copper wire, a winding produced by winding an annealed copper wire, or a metal sheet formed at an upper portion or a lower portion of the braided wire or the winding.

3. The cable according to claim 2, wherein the metal sheet includes metal such as aluminum, copper, or iron.

4. The cable according to claim 1, wherein the line includes a twisted pair cable for transmitting at least one or more sets of signals.

5. The cable according to claim 1, wherein the first layer and the second layer include a magnetic material that is vapor deposited on or applied to opposite surfaces of the second shield member.

6. The cable according to claim 1, wherein a tape or a sheet formed by vapor depositing or applying the first layer of magnetic material and the second layer of magnetic material on or to opposite surfaces of the second shield member is wrapped on an outer side of the first shield member.

7. The cable according to claim 1, wherein the first layer has a high frequency resistance and has a function of converting noise into heat.

8. The cable according to claim 1, wherein the second layer has a function of a magnetic shield for preventing an influence of a magnetic field.

9. An antenna device with a coaxial cable, wherein the cable according to claim 1 is connected to a balanced type antenna.

10. The antenna device with a coaxial cable according to claim 9, wherein the coaxial cable connected to the balanced type antenna has a length equal to or longer than 1 m.

11. The antenna device with a coaxial cable according to claim 9, wherein a connector of the coaxial cable connected to the balanced type antenna is an IEC connector or an F connector.

12. An antenna device with a coaxial cable, wherein the cable according to claim 1 is connected to a balanced type antenna.

* * * * *